(12) United States Patent
Zhang et al.

(10) Patent No.: US 12,132,787 B2
(45) Date of Patent: Oct. 29, 2024

(54) COMMUNICATION METHOD AND APPARATUS

(71) Applicant: HUAWEI TECHNOLOGIES CO., LTD., Guangdong (CN)

(72) Inventors: Di Zhang, Shenzhen (CN); Youyang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/161,234

(22) Filed: Jan. 30, 2023

(65) Prior Publication Data

US 2023/0171320 A1 Jun. 1, 2023

Related U.S. Application Data

(63) Continuation of application No. PCT/CN2021/109242, filed on Jul. 29, 2021.

(30) Foreign Application Priority Data

Jul. 31, 2020 (CN) .......................... 202010763603.2
Dec. 31, 2020 (CN) .......................... 202011619206.4

(51) Int. Cl.
G06F 15/16 (2006.01)
H04L 67/141 (2022.01)
H04L 12/66 (2006.01)

(52) U.S. Cl.
CPC ............ *H04L 67/141* (2013.01); *H04L 12/66* (2013.01)

(58) Field of Classification Search
USPC ....................................................... 709/227
See application file for complete search history.

(56) References Cited

U.S. PATENT DOCUMENTS

2019/0260690 A1\* 8/2019 Sun .................... H04L 41/0895
2019/0306204 A1\* 10/2019 Roche .................. H04L 67/125
2020/0280873 A1 9/2020 Yan et al.

FOREIGN PATENT DOCUMENTS

CN 109714376 A 5/2019
CN 110417840 A 11/2019
(Continued)

OTHER PUBLICATIONS

Ishan Vaishnavi et al., Liaison from ISG ZSM to IETF for TN coordination, ETSI ISG ZSM, https://www.3gpp.org/ftp/Inbox/LSs_from_external_bodies/ISG_ZSM, Feb. 11, 2020, 2 pages.
(Continued)

*Primary Examiner* — Wing F Chan
*Assistant Examiner* — Andrew Woo

(57) ABSTRACT

A communication method and apparatus includes: An access gateway function network element sends a session establishment request message of a terminal to a session management function network element. The session management function network element sends, to the access gateway function network element, at least one of a session identifier and an address of the terminal that correspond to an established session. The access gateway function network element obtains virtual interface information corresponding to the identifier of the established session. The access gateway function network element further sends the virtual interface information and the at least one of the session identifier and the address of the terminal to the terminal, so that the terminal establishes a first association relationship between the virtual interface information and the at least one of the session identifier and the address of the terminal.

12 Claims, 22 Drawing Sheets

(56) References Cited

FOREIGN PATENT DOCUMENTS

EP          3720203 A1 * 10/2020  ............ H04W 48/16
WO     2019128672 A1      7/2019

OTHER PUBLICATIONS

International Search Report and Written Opinion issued in PCT/CN2021/109242, dated Oct. 20, 2021, 10 pages.
Extended European Search Report dated Dec. 14, 2023, issued for European Application No. 21848563.9 (12 pages).

* cited by examiner

COMMUNICATION METHOD AND APPARATUS

CROSS-REFERENCE TO RELATED APPLICATIONS

This application is a continuation of International Application No. PCT/CN2021/109242, filed on Jul. 29, 2021. The International Application claims priority to Chinese Application No. 202010763603.2, filed on Jul. 31, 2020 and Chinese Application No. 202011619206.4 filed on Dec. 31, 2020. All of the aforementioned patent applications are hereby incorporated by reference in their entireties.

TECHNICAL FIELD

This disclosure relates to the field of communication technologies, and in particular, to a communication method and an apparatus.

BACKGROUND

To address challenges from wireless broadband technologies and maintain a leading edge of 3rd generation partnership project (3GPP) networks, the 3GPP standards group formulates a next generation mobile communication network architecture, which is referred to as a 5th generation (5G) fixed-mobile convergence network architecture. The network architecture not only supports access to a 5G core (5GC) network by using a wireless technology (such as long term evolution (LTE) or a 5G radio access network (RAN) defined by the 3GPP standards group, but also supports access to the core network via a fixed network.

As shown in FIG. 1A, a 5G-residential gateway (RG) is connected to a wired access network, and is connected to a 5G core network via an access node (access node, AN) and an access gateway function (AGF) network element of the wired access network. The 5G-RG may alternatively be connected to a 5G core network via a radio access network (RAN) device. In the figure, there is a connection channel between the 5G-RG and the AGF network element, and the connection channel is for transmitting a control plane packet and a user plane packet from the 5G-RG to the 5G core network.

Currently, in the 5G fixed-mobile convergence network architecture, no related solution has been provided to manage a connection between a 5G-RG and an AGF for distinguishing between different services.

SUMMARY

This disclosure provides a communication method and an apparatus, to establish an association relationship by a terminal and an access gateway function network element between a session identifier and virtual interface information, for distinguishing between different services based on the association relationship. In this way, an end-to-end user plane connection between the terminal and the access gateway function network element is implemented, and end-to-end quality of service is ensured.

According to a first aspect, an embodiment of this disclosure provides a communication method, and the method may be performed by a first communication apparatus. The first communication apparatus may be an access gateway function network element, or a communication apparatus that can support the access gateway function network element in implementing a function required by the method, for example, a component included in the access gateway function network element, or a chip system in the access gateway function network element. For example, the method is performed by the access gateway function network element. The method includes: The access gateway function network element sends a session establishment request message to a session management function network element, where the session establishment request message is for requesting to establish or modify a first session. The access gateway function network element receives at least one of a session identifier and an address of a terminal from the session management function network element, where both the session identifier and the address of the terminal correspond to the first session. The access gateway function network element obtains virtual interface information corresponding to the session identifier, where the virtual interface information is an identifier of a virtual interface between the terminal and the access gateway function network element. The access gateway function network element sends the virtual interface information and the at least one of the session identifier and the address of the terminal to the terminal.

In this embodiment of this disclosure, an association relationship is established by the terminal and the access gateway function network element between the virtual interface information and the at least one of the session identifier and the address of the terminal, for distinguishing between different services based on the association relationship. In this way, an end-to-end user plane connection between the terminal and the access gateway function network element is implemented, and end-to-end quality of service is ensured. According to the method, a fixed network may distinguish between different services based on virtual interface information, so that a fixed network service can smoothly evolve to a 5G system with better system compatibility.

In a possible implementation, the obtaining virtual interface information corresponding to the session identifier includes: The access gateway function network element receives an access stratum message from the terminal, where the access stratum message includes the virtual interface information. The access gateway function network element determines that the virtual interface information corresponds to the session identifier.

In a possible implementation, the obtaining virtual interface information corresponding to the session identifier includes: The access gateway function network element allocates the virtual interface information to the first session. The access gateway function network element determines that the virtual interface information corresponds to the session identifier.

In a possible implementation, the obtaining virtual interface information corresponding to the session identifier includes:

The access gateway function network element receives first information from the terminal, where the first information is data network name DNN information and/or network slice information corresponding to the session identifier.

The access gateway function network element determines the virtual interface information corresponding to the DNN information and/or the network slice information, and determines that the virtual interface information corresponds to the session identifier.

In a possible implementation, the obtaining virtual interface information corresponding to the session identifier includes:

The access gateway function network element receives first information from the session management function network element, where the first information is DNN information and/or network slice information corresponding to the session identifier.

The access gateway function network element determines the virtual interface information corresponding to the first information.

In a possible implementation, the obtaining virtual interface information corresponding to the session identifier includes:

The access gateway function network element receives a message from the session management function network element, where the message includes the virtual interface information corresponding to the first session.

In a possible implementation, based on the association relationship between the session identifier and the virtual interface information, the access gateway function network element receives a first packet from the terminal, where the first packet includes the virtual interface information; and the access gateway function network element sends the first packet to a user plane function network element based on the session identifier corresponding to the virtual interface information via a user plane tunnel corresponding to the session identifier, where the user plane tunnel is a transmission channel between the access gateway function network element and the user plane function network element. According to the foregoing method, the access gateway function network element may obtain the virtual interface information carried in an uplink packet, and determine a corresponding session based on the virtual interface information, so that a packet is correctly sent to the user plane function network element, to ensure the end-to-end user plane connection between the terminal and the access gateway function network element.

In a possible implementation, based on the association relationship between the session identifier and the virtual interface information, the access gateway function network element receives a second packet from a user plane function network element, where the second packet includes a user plane tunnel identifier of the user plane function network element; and the access gateway function network element determines, based on a session identifier corresponding to the user plane tunnel identifier, the virtual interface information corresponding to the session identifier, and sends the second packet to the terminal through a virtual interface corresponding to the virtual interface information, where the virtual interface is the virtual interface between the terminal and the access gateway function network element. According to the foregoing method, the access gateway function network element may obtain a session identifier corresponding to a downlink packet, and encapsulate the second packet by using the virtual interface information, so that a packet is correctly sent to the terminal, to ensure the end-to-end user plane connection between the terminal and the access gateway function network element.

According to a second aspect, an embodiment of this disclosure provides a communication method, and the method may be performed by a third communication apparatus. The third communication apparatus may be a terminal, or a communication apparatus that can support the terminal in implementing a function required by the method, for example, a component included in the terminal, or a chip system in the terminal. For example, the method is performed by the terminal. The method includes: The terminal sends a first message to an access gateway function network element, where the first message is for requesting to establish or modify a first session. The terminal obtains virtual interface information, where the virtual interface information corresponds to the first session, and the virtual interface information is an identifier of a virtual interface between the terminal and the access gateway function network element.

In this embodiment of this disclosure, after obtaining the virtual interface information corresponding to the first session, the terminal may establish a correspondence between the virtual interface information and at least one of a session identifier and a session address, for distinguishing between different services based on the association relationship. In this way, an end-to-end user plane connection between the terminal and the access gateway function network element is implemented, and end-to-end quality of service is ensured. According to the method, a fixed network may distinguish between different services based on virtual interface information, so that a fixed network service can smoothly evolve to a 5G system with better system compatibility.

In a possible implementation, the obtaining virtual interface information includes: The terminal receives the virtual interface information from the access gateway function network element.

In a possible implementation, the obtaining virtual interface information includes: The terminal obtains policy information from a policy control function network element, where the policy information includes the virtual interface information.

In a possible implementation, the policy information further includes DNN information and/or network slice information corresponding to the virtual interface information.

According to a third aspect, an embodiment of this disclosure provides a communication method, and the method may still be performed by a first communication apparatus. For example, the method is performed by an access gateway function network element. The method includes: The access gateway function network element receives first service information from a terminal. The access gateway function network element sends a session establishment request message to a session management function network element, where the session establishment request message includes second service information corresponding to the first service information, and the session establishment request message is for requesting to establish or modify a first session of the terminal. The access gateway function network element receives an address of the terminal from the session management function network element, where the address of the terminal corresponds to the first session. The access gateway function network element sends the first service information and the address of the terminal to the terminal.

In this embodiment of this disclosure, an association relationship is established by the terminal and the access gateway function network element between the first service information and the address of the terminal to the terminal, for distinguishing between different services based on the association relationship. In this way, an end-to-end user plane connection between the terminal and the access gateway function network element is implemented, and end-to-end quality of service is ensured. According to the method, a fixed network may distinguish between different services based on the address of the terminal, so that a fixed network service can smoothly evolve to a 5G system with better system compatibility.

In a possible implementation, the first service information includes domain name information and/or virtual interface information.

In a possible implementation, the second service information includes a data network name DNN and/or network slice information.

In a possible implementation, the method further includes: The access gateway function network element receives an identifier of the terminal from the terminal; and sends the first service information, the identifier of the terminal, and the address of the terminal to the terminal.

In a possible implementation, the identifier of the terminal includes at least one of an IP address, a MAC address, or a user identifier in a network access identifier NAI.

In a possible implementation, the access gateway function network element sends a first message to an access and mobility management network element, where the first message includes the first service information. The access gateway function network element receives a second message from the access and mobility management network element, where the second message includes the second service information. According to this method, the access gateway function network element may obtain a correspondence between the first service information and the second service information from the access and mobility management network element.

In a possible implementation, that the access gateway function network element obtains first information based on at least one information in the first service information includes:

The access gateway function network element sends a request message to a first network element, where the request message includes the first service information. The access gateway function network element receives a response message from the first network element, where the response message includes the second service information. According to this method, the access gateway function network element may obtain a correspondence between the first service information and the second service information from the first network element.

In a possible implementation, the method further includes: The access gateway function network element stores the correspondence between the first service information and the second service information.

In a possible implementation, the method further includes: The access gateway function network element stores a correspondence between the identifier of the terminal, the first service information, and the address of the terminal.

In a possible implementation, the method further includes: The access gateway function network element receives an identifier of the first session from the session management function network element; and stores a correspondence between the identifier of the terminal, the first service information, and the identifier of the first session.

According to a fourth aspect, an embodiment of this disclosure provides a communication method, and the method may still be performed by a second communication apparatus. For example, the method is performed by the terminal. The method includes: The terminal sends first service information to an access gateway function network element. Then, the terminal receives an address of the terminal from the access gateway function network element, where the address of the terminal corresponds to the first service information. The first service information may include domain name information and/or virtual interface information.

In a possible implementation, the terminal further sends an identifier of the terminal to the access gateway function network element. The identifier of the terminal includes an IP address, a MAC address, or a user identifier in a network access identifier NAI.

In a possible implementation, the terminal stores a correspondence between the first service information and the address of the terminal.

In this embodiment of this disclosure, after obtaining the address of the terminal of the first session, the terminal may establish the correspondence between the address of the terminal and the first service information, for distinguishing between different services based on the association relationship. In this way, an end-to-end user plane connection between the terminal and the access gateway function network element is implemented, and end-to-end quality of service is ensured. According to the method, a fixed network may distinguish between different services based on the address of the terminal, so that a fixed network service can smoothly evolve to a 5G system with better system compatibility.

According to a fifth aspect, this disclosure provides an apparatus. The apparatus may be a first communication apparatus. The apparatus has a function of implementing the embodiment of the first aspect or the third aspect. The function may be implemented by hardware, or may be implemented by hardware executing corresponding software. The hardware or the software includes one or more modules corresponding to the function.

In a possible implementation, when the apparatus is an access gateway function network element, the access gateway function network element includes a communication unit, and optionally includes a processing unit. The processing unit may be, for example, a processor. A receiving unit may be, for example, a receiver. A sending unit may be, for example, a transmitter. The receiver and the transmitter include a radio frequency circuit. Optionally, the access gateway function network element further includes a storage unit, and the storage unit may be, for example, a memory. When the access gateway function network element includes the storage unit, the storage unit stores computer-executable instructions, the processing unit is connected to the storage unit, and the processing unit executes the computer-executable instructions stored in the storage unit, so that the access gateway function network element performs the method according to any one of the first aspect or the third aspect.

In another possible implementation, when the apparatus is a chip in the access gateway function network element, the chip includes a receiving unit and a sending unit, and optionally includes a processing unit. The processing unit may be, for example, a processing circuit. The receiving unit may be, for example, an input interface, a pin, a circuit, or the like. The sending unit may be, for example, an output interface, a pin, a circuit, or the like. The processing unit may execute computer-executable instructions stored in a storage unit, so that the method according to any one of the first aspect or the third aspect is performed. Optionally, the storage unit is a storage unit in the chip, for example, a register or a cache. The storage unit may alternatively be a storage unit located outside the chip in the access gateway function network element, for example, a read-only memory (ROM), another type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the method according to the first aspect or the third aspect.

According to a sixth aspect, this disclosure provides an apparatus. The apparatus may be a second communication apparatus. The apparatus has a function of implementing the embodiment of the second aspect or the fourth aspect. The function may be implemented by hardware, or may be implemented by hardware executing corresponding software. The hardware or the software includes one or more modules corresponding to the function.

In a possible implementation, when the apparatus is a terminal, the terminal includes a communication unit, and optionally includes a processing unit. The processing unit may be, for example, a processor. A receiving unit may be, for example, a receiver. A sending unit may be, for example, a transmitter. The receiver and the transmitter include a radio frequency circuit.

Optionally, the terminal further includes a storage unit, and the storage unit may be, for example, a memory. When the terminal includes the storage unit, the storage unit stores computer-executable instructions, the processing unit is connected to the storage unit, and the processing unit executes the computer-executable instructions stored in the storage unit, so that the terminal performs the method according to any one of the second aspect or the fourth aspect.

In another possible implementation, when the apparatus is a chip in the terminal, the chip includes a receiving unit and a sending unit, and optionally includes a processing unit. The processing unit may be, for example, a processing circuit. The receiving unit may be, for example, an input interface, a pin, a circuit, or the like. The sending unit may be, for example, an output interface, a pin, a circuit, or the like. The processing unit may execute computer-executable instructions stored in a storage unit, so that the sending method according to any one of the second aspect or the fourth aspect is performed. Optionally, the storage unit is a storage unit in the chip, for example, a register or a cache. The storage unit may alternatively be a storage unit located outside the chip in the terminal, for example, a read-only memory (ROM), another type of static storage device capable of storing static information and instructions, or a random access memory (RAM).

The processor mentioned anywhere above may be a general-purpose central processing unit (CPU), a microprocessor, an application-specific integrated circuit (ASIC), or one or more integrated circuits configured to control program execution of the method according to the second aspect or the fourth aspect.

According to a seventh aspect, this disclosure further provides a computer-readable storage medium. The computer-readable storage medium stores instructions. When the instructions are run on a computer, the computer performs the methods according to the foregoing aspects.

According to an eighth aspect, this disclosure further provides a computer program product including instructions. When the computer program product runs on a computer, the computer performs the methods according to the foregoing aspects.

In addition, for a technical effect brought by any design scheme in the fifth aspect to the eighth aspect, refer to the technical effects brought by different design schemes in the first aspect to the fourth aspect. Details are not described again herein.

DESCRIPTION OF EMBODIMENTS

Figure 1A:
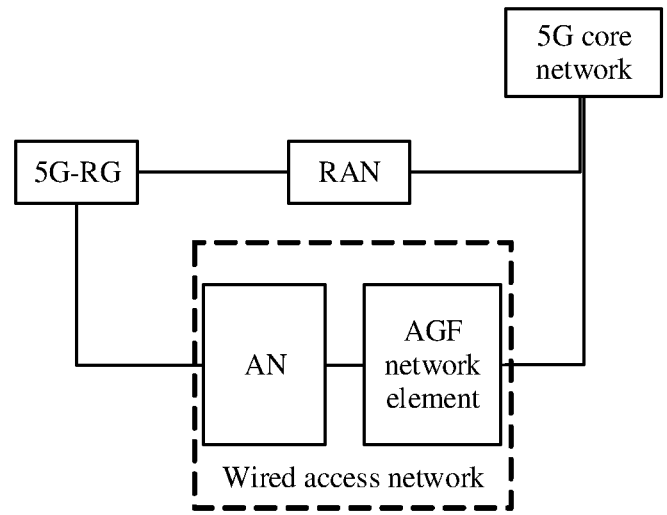
FIG. 1A, FIG. 1B, and FIG. 2 are schematic diagrams of possible network architectures according to embodiments of this disclosure.

To make objectives, technical solutions, and advantages of embodiments of this disclosure clearer, the following further describes embodiments of this disclosure in detail with reference to the accompanying drawings.

The following describes some terms in embodiments of this disclosure, to facilitate understanding of a person skilled in the art.

(1) A terminal device is also referred to as a terminal, user equipment (UE), a mobile station (MS), a mobile terminal (MT), or the like, and is a device that provides voice and/or data connectivity for a user. For example, the terminal device may include a handheld device having a wireless connection function or a processing device connected to a wireless modem.

The terminal device may communicate with a core network through a radio access network (RAN), and exchange voice and/or data with the RAN. The terminal may include user equipment (UE), a wireless terminal, a mobile terminal, a subscriber unit, a subscriber station, a mobile station, a remote station, an access point (AP), a remote terminal, an access terminal, a user terminal, a user agent, a user device, or the like. In embodiments of this disclosure, a 5G-RG may also be referred to as a terminal device. Remote UE may be connected to a wired access network via the 5G-RG, and then access a 5G core network through the wired access network. The remote UE may alternatively be connected to a 5G core network via the RAN.

For example, the terminal device may include a mobile phone (which is also referred to as a "cellular" phone), a computer having a mobile terminal, a portable, pocket-sized, handheld, computer built-in, or vehicle-mounted mobile apparatus, or a wearable intelligent device. For example, the terminal device may be a device such as a personal communications service (PCS) phone, a cordless phone, a session initiation protocol (SIP) phone, a wireless local loop (WLL) station, or a personal digital assistant (PDA).

Alternatively, the terminal device may further include a limited device, for example, a device with low power consumption, a device with a limited storage capability, or a device with a limited computing capability. For example, the terminal device includes an information sensing device such as a barcode, radio frequency identification (RFID), a sensor, a global positioning system (GPS), or a laser scanner.

By way of example but not limitation, in embodiments of this disclosure, the intelligent wearable device is an umbrella term of wearable devices such as glasses, gloves, watches, clothes, and shoes that are developed by applying wearable technologies to intelligent designs of daily wear. The intelligent wearable device is a portable device that is directly worn on the body or integrated into clothes or an accessory of a user.

The intelligent wearable device is not only a hardware device, but also implements a powerful function through software support, data exchange, and cloud interaction. Generalized intelligent wearable devices include full-featured and large-sized devices that can implement complete or partial functions without depending on smartphones, for example, smart watches or smart glasses, and devices that are dedicated to only one type of application function and need to work with other devices such as smartphones, for example, various smart bands, smart helmets, or smart jewelry for monitoring physical signs.

Alternatively, the terminal may be a virtual reality (VR) device, an augmented reality (AR) device, a wireless terminal in industrial control, a wireless terminal in self driving (driverless), a wireless terminal in remote medical surgery, a wireless terminal in a smart grid, a wireless terminal in transportation safety, a wireless terminal in a smart city (smart city), a wireless terminal in a smart home, or the like.

(2) A (radio) access network ((R)AN) device, for example, including a base station (for example, an access point), may be a device that is in an access network and that communicates with a wireless terminal over an air interface via one or more cells. The (radio) access network device may be configured to perform mutual conversion between a received over-the-air frame and an internet protocol (IP) packet, and serve as a router between remote UE and a remaining portion of the access network, and the remaining portion of the access network may include an IP network. The (radio) access network device may further coordinate attribute management of the air interface.

For example, the (radio) access network device may include a radio network controller (RNC), a NodeB (NB), a base station controller ( ), a base transceiver station (BTS), a home base station (for example, a home evolved NodeB, or a home NodeB, HNB), a baseband unit (BBU), or a wireless fidelity (Wi-Fi) access point (AP).

The (radio) access network device may alternatively include an evolved NodeB (NodeB, eNB) in a long term evolution (LTE) system, an LTE-Advanced (LTE-A) system, or a 4th generation mobile communication technology (, 4G) system.

Alternatively, the (radio) access network device may include a next generation NodeB (gNB), a transmission reception point (TRP), or a transmission point (TP) in a 5G system or a new radio (NR) system.

Alternatively, the (radio) access network device may include a central unit (CU) and/or a distributed unit (DU) in a cloud radio access network (CloudRAN) system. This is not limited in embodiments of this disclosure. In embodiments of this disclosure, technical terms "(radio) access network device" and "access network device" may be used interchangeably.

(3) A core network (CN) device is connected to a plurality of access networks, and includes a circuit switched (CS) domain and/or a packet switched (PS) domain CS network elements include a mobile switching center, a visited location register, and a gateway mobile switching center, and PS network elements include a general packet radio service (GPRS) node and a gateway GPRS support node. Some network elements such as a home location register, the visited location register, and an authentication center may be shared by the CS domain and the PS domain.

(4) "A plurality of" in embodiments of this disclosure means two or more than two. In view of this, "a plurality of" in embodiments of this disclosure may also be understood as "at least two". "At least one" may be understood as one or more, for example, one, two, or more.

For example, "include at least one" means "include one, two, or more", and there is no limitation on which is included. For example, "include at least one of A, B, and C" may mean "include A, B, or C", "include A and B, A and C, or B and C", or "include A, B, and C".

The term "and/or" describes an association relationship between associated objects and represents that three relationships may exist. For example, A and/or B may represent the following three cases: Only A exists, both A and B exist, and only B exists.

In addition, the character "/" usually indicates an "or" relationship between the associated objects. The terms "system" and "network" may be used interchangeably in embodiments of this disclosure.

Unless otherwise specified, ordinal numbers such as "first" and "second" in embodiments of this disclosure are used to distinguish between a plurality of objects, and are not intended to limit a sequence, a time sequence, priorities, or importance of the plurality of objects.

As shown in FIG. 1A, a 5G-residential gateway (RG) is connected to a wired access network, and is connected to a 5G core network via an access node (AN) and an access gateway function (AGF) network element of the wired access network. The 5G-RG may alternatively be connected to a 5G core network via a radio access network (RAN) device. In the figure, there is a connection channel between the 5G-RG and the AGF network element, and the connection channel is for transmitting a control plane packet and a user plane packet from the 5G-RG to the 5G core network.

Figure 1B:
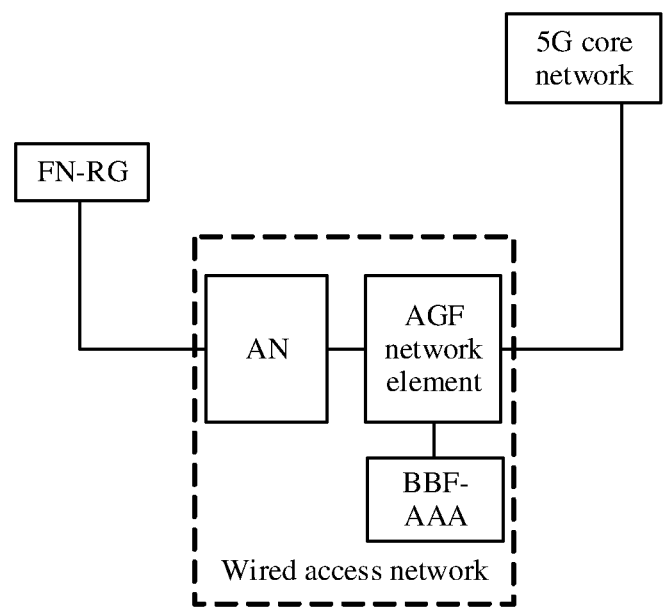

As shown in FIG. 1B, a wired access fixed network—residential gateway (FN-RG) is connected to a wired access network, and is connected to a 5G core network via an access node (AN) and an access gateway function (AGF) network element of the wired access network. In other words, because the FN-RG is a legacy device and does not support an N1 interface, that is, does not support direct communication with the 5G core network, the FN-RG needs to communicate with the 5G core network via an AGF as an agent for the FN-RG. The AGF network element is connected to a BBF-AAA, and the BBF-AAA is used for authentication, authorization, and accounting management.

Figure 2:
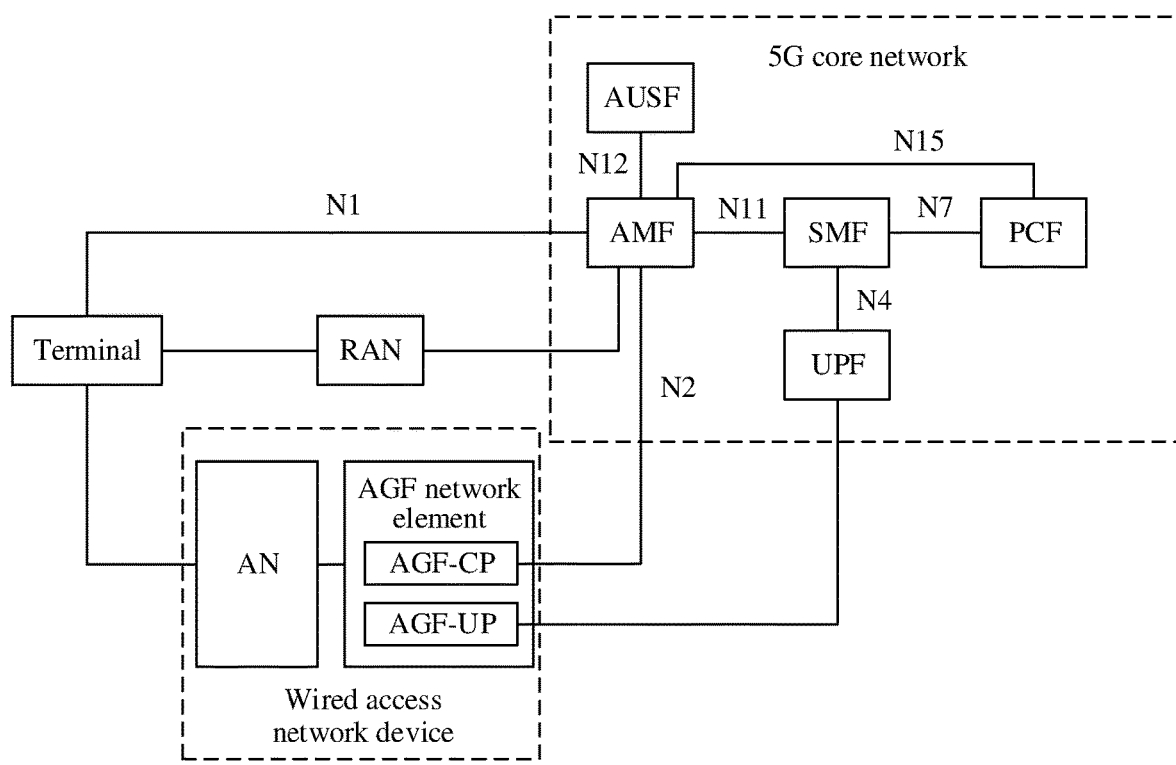

FIG. 2 is a schematic diagram of a possible network architecture to which this disclosure is applicable. The network architecture includes a terminal, an AN, an AGF network element, a RAN, and a 5G core network.

The 5G core network may include a control plane network element and a user plane network element. The user plane network element is mainly responsible for forwarding a data packet, controlling quality of service (QoS), collecting charging information, and the like. The control plane network element is mainly responsible for delivering a data packet forwarding policy, a QoS control policy, or the like to the user plane function network element.

As shown in FIG. 2, the control plane network elements include an access and mobility management function (AMF) network element, a session management function (SMF) network element, a policy control function (PCF) network element, and an authentication server function (AUSF) network element; and the user plane network element includes a user plane function (UPF) network element.

The terminal includes, for example, a residential gateway (RG), and the RG may specifically include a modem or the like. The terminal is a fixed gateway device that supports 5G access, and is also referred to as a 5G-RG or an FN-RG. The terminal mentioned below in embodiments of this disclosure may be understood as the 5G-RG or the FN-RG.

The 5G-RG can send a non-access stratum (NAS) message to the AMF network element through an N1 interface over an air interface or via a fixed network. The N1 interface is an interface between the terminal and the AMF network element. The terminal may further be connected to remote UE. The remote UE may be a terminal device such as UE, an MT, or an MS described above. The FN-RG is a legacy device and does not support the N1 interface. The FN-RG communicates with the 5G core network via the AGF as an agent for the FN-RG.

The access node is also referred to as a wireline access node (WAN). The access node may provide an access service for the terminal in different access manners.

The access gateway function (AGF) network element is an access node for the fixed network to access the 5G core network. The AGF network element may communicate with a core network control plane network element, such as the AMF network element, through an N2 interface. The AGF network element may further send a data packet (which is also referred to as a packet) of a fixed network user to a core network user plane network element (for example, the user plane function (UPF) network element) through an N3 interface.

It should be noted that the access node and the AGF network element are also collectively referred to as a W-AGF, or collectively referred to as a wired access network device.

As shown in FIG. 2, in an implementation, the terminal may access the core network in a wired manner via a wired access network device. In another implementation, the terminal may further access the core network in a wireless (which is also referred to as an air interface) manner via a radio access network device, such as a base station, in a radio access network (RAN). In other words, the terminal may send an air interface message to the core network.

In FIG. 2, the AGF network element includes an AGF control plane (AGF-CP) and an AGF user plane (AGF-UP). The AGF-CP is configured to process control plane signaling and manage the AGF-UP, for example, deliver a control policy to the AGF-UP. The AGF-UP is configured to process user plane data according to the control policy delivered by the AGF-CP. The AGF-CP may communicate with the AMF network element through N2, and the AGF-UP may communicate with the UPF network element through N3. The terminal may communicate with the AMF network element through the N1 interface. The UPF network element may communicate with the SMF network element through an N4 interface. The SMF network element may communicate with the PCF network element through an N7 interface. The AMF network element may communicate with the SMF network element through an N11 interface. The AMF network element may communicate with the AUSF network element through an N12 interface.

The following separately describes functions of network elements in the 5G core network in FIG. 2.

A mobility management network element, for example, may be the AMF network element in 5G. The mobility management network element is responsible for access management and mobility management of an access device. The mobility management network element includes a mobility management function of a mobility management entity (MME) in a network framework in LTE, and includes an access management function.

The SMF network element is responsible for session management such as user session establishment.

The PCF network element is configured to perform policy control, and is mainly responsible for policy authorization, generation of QoS and a charging rule, and delivery of a corresponding rule to the UPF via the SMF network element, to complete installation of a corresponding policy and rule.

The AUSF network element has an authentication service function, and is configured to terminate an authentication function requested by a security anchor function (SEAF) network element.

For ease of description, in this disclosure, the AGF network element, the AMF network element, the SMF network element, the PCF network element, the AUSF network element, and the UPF network element may be respectively referred to as an AGF, an AMF, an SMF, a PCF, an AUSF and a UPF for short.

It should be noted that names of interfaces between network elements in FIG. 1A, FIG. 1B, and FIG. 2 are merely examples, and the interfaces may have other names during specific implementation. This is not specifically limited in embodiments of this disclosure.

It should be noted that names of devices such as the terminal, the access node, the access gateway function network element, and the mobility management network element in FIG. 1A, FIG. 1B, and FIG. 2 do not constitute a limitation on the devices. In a 5G network and another future network, the terminal, the access node, the access gateway function network element, and the mobility management network element may also be device names This is not specifically limited in embodiments of this disclosure. For example, the terminal may alternatively be replaced by a terminal device, user equipment, or the like. The access node may alternatively be replaced by a wireline access node, a fixed network access node, or the like. The access gateway function network element may alternatively be replaced by a gateway device, an access gateway function device, or the like. A general description is provided herein, and details are not described below again. It should be noted that the AGF in FIG. 2 is an upper layer convergence point of the AN, and is deployed on a fixed network access network side. The AGF is wiredly connected to the fixed network AN in FIG. 2.

The network architecture and the service scenario described in embodiments of this disclosure are intended to describe the technical solutions in embodiments of this disclosure more clearly, and do not constitute a limitation on the technical solutions provided in embodiments of this disclosure. A person of ordinary skill in the art may know that: With the evolution of the network architecture and the emergence of new service scenarios, the technical solutions provided in embodiments of this disclosure are also applicable to resolving similar technical problems.

In a 5G fixed-mobile convergence network architecture, when a terminal accesses a 5G core network in a wired manner, end-to-end quality of service still needs to be ensured. For example, a parameter for ensuring QoS is identified on a transmission channel, so that each network element can effectively schedule a resource based on the identifier. The identifier may include a PDU session ID, a QFI, a reflective quality of service indication (RQI), and the like. Therefore, the parameter for ensuring the QoS needs to be identified on a corresponding tunnel between an AGF and a 5G-RG, for example, the PDU session ID, the QFI, or the RQI is identified.

Therefore, this disclosure provides a session establishment method. The method includes: A terminal sends a session establishment request message to an SMF. The terminal receives a session establishment complete message returned by the SMF. The terminal establishes a PDU session with a network side device. The terminal and an AGF further establish an association relationship between virtual interface information and at least one of a session identifier of the PDU session and an address of the terminal. Because the PDU session is related to the virtual interface information, based on the association relationship, in a subsequent data transmission process, for an uplink packet, the AGF may determine, based on virtual interface information in the uplink packet from the terminal, a PDU session corresponding to the virtual interface information, and correctly send the packet to a corresponding UPF network element; and for a downlink packet, the AGF may determine corresponding virtual interface information based on a PDU session for transmitting the downlink packet, to forward the downlink packet to a terminal corresponding to the virtual interface information. Based on the association relationship, a connection between the terminal and the AGF one-to-one corresponds to a quality of service flow of a PDU session. This implements an end-to-end user plane connection between the terminal and the AGF, and ensures end-to-end quality of service.

For ease of description, the following describes the session establishment method provided in embodiments of this disclosure by using an example in which a terminal is a 5G-RG or an FN-RG, an access gateway function network element is an AGF-CP and an AGF-UP, a mobility management network element is an AMF network element, and a session management function network element is an SMF.

Embodiment 1

Figure 3:
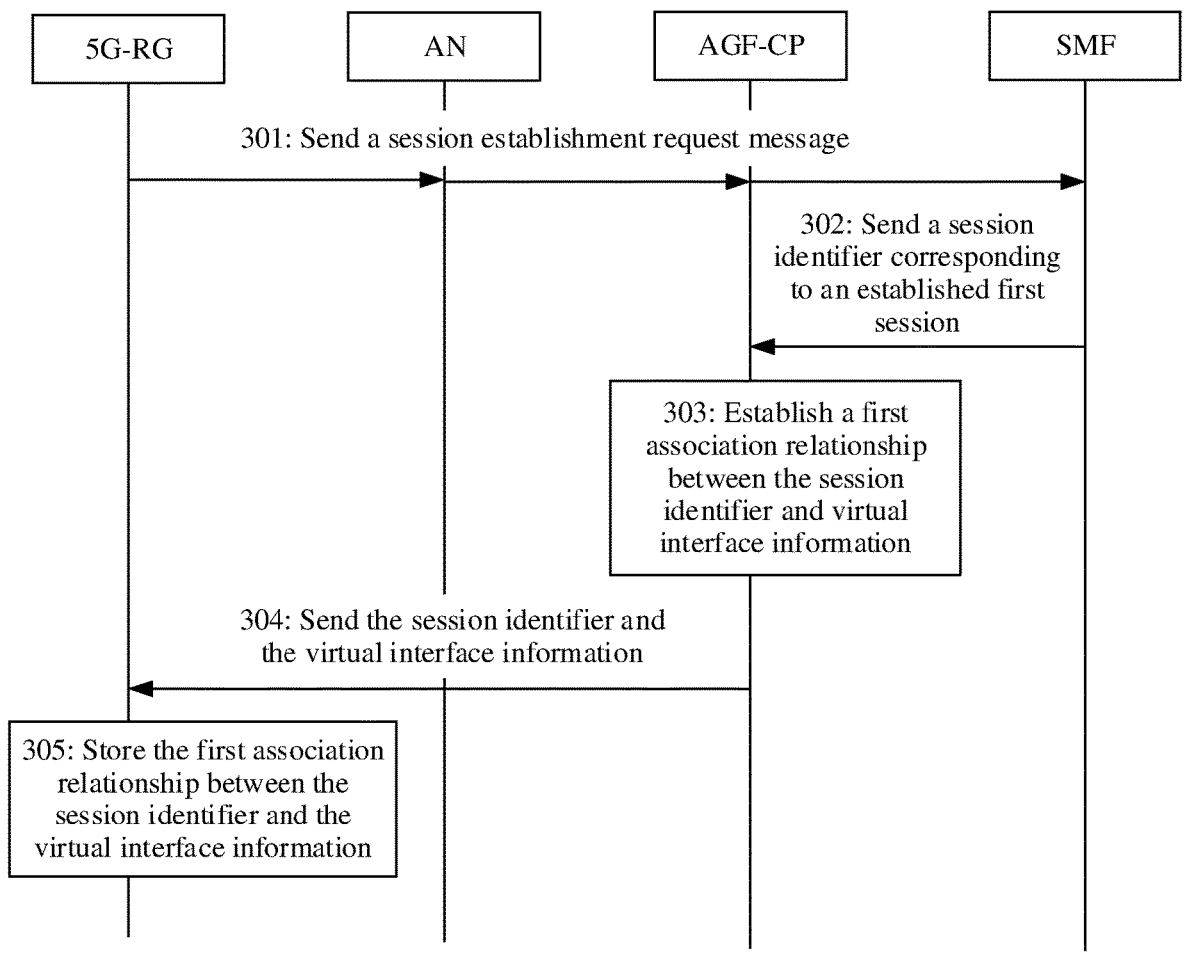
FIG. 3 is a schematic flowchart of a first session establishment method according to this disclosure.

FIG. 3 is a schematic flowchart of a first session establishment method according to this disclosure. Specifically, the method may include the following steps.

FIG. 3 is a schematic flowchart of a first session establishment method according to this disclosure. Specifically, the method may include the following steps.

Step 301: A 5G-RG sends a session establishment request message to an SMF via an AGF-CP, where the session establishment request is for requesting to establish or modify a first session.

Optionally, the 5G-RG further sends, to the SMF via the AGF-CP, virtual interface information or first information corresponding to the session establishment request. The first information may include at least one of network handover information and DNN information. The session establishment request message may be a non-access stratum (NAS) message, and the NAS message includes a PDU session establishment request message for requesting to establish a PDU session.

In this step, the 5G-RG may first send the session establishment request message to an AN, where the session establishment request message is for requesting to establish the first session. Then, the AN forwards the session establishment request message to the AGF-CP, and the AGF-CP forwards the session establishment request message to an AMF. After receiving the session establishment message from the AGF-CP, the AMF notifies the SMF to complete an operation related to session establishment on a core network control plane. In this process, neither the AN nor the AGF-CP parses specific content in the session establishment message, but forwards the received session establishment message.

In a first possible embodiment, when a correspondence between a service type (for example, an internet protocol television service) and virtual interface information (for example, a VLAN ID) is preconfigured on the 5G-RG, the 5G-RG may first determine virtual interface information corresponding to a to-be-transmitted fixed network service. When the 5G-RG sends the session establishment request message to the SMF, the 5G-RG further sends, to the SMF, the virtual interface information corresponding to the session establishment request. Specifically, the 5G-RG may send, to the AGF-CP via an access stratum (AS) parameter, the virtual interface information corresponding to the session establishment request.

In a second possible embodiment, the 5G-RG first determines data network name (DNN) information or network handover information corresponding to a to-be-transmitted fixed network service. When the 5G-RG sends the session establishment request message to the SMF, the 5G-RG further sends, to the SMF, the DNN information or the network handover information corresponding to the session establishment request. Specifically, the 5G-RG may send, to the AGF-CP via an access stratum (AS) parameter, the DNN information or the network handover information corresponding to the session establishment request.

The virtual interface information is an identifier of a virtual interface between the 5G-RG and the AGF, and the identifier of the virtual interface can be used to distinguish between virtual channel information of a fixed network service. For example, the virtual interface information may be virtual path identifier (VPI) or virtual channel identifier (VCI) information in a digital subscriber line (DSL), virtual local area network (VLAN) information accessed by the ethernet, or the like.

Step 302: The SMF sends a session identifier corresponding to the established first session to the AGF-CP.

Optionally, after receiving the session establishment message from the AGF-CP, the SMF completes the operation related to the session establishment on the core network control plane, and then the SMF sends a session establishment complete message and the session identifier of the established first session to the AGF-CP via the AMF.

The session identifier of the established session may be a PDU session identifier. Further, the session establishment complete message may further include tunnel information of a UPF corresponding to the established session, for example, include a general packet radio service (GPRS) tunneling protocol—user plane (GTP-U) and/or a tunnel endpoint identifier (TEID).

Step 303: The AGF-CP establishes a first association relationship between the session identifier and the virtual interface information based on the virtual interface information or the first information from the 5G-RG and the session identifier corresponding to the established first session from the SMF.

Specifically, the AGF establishes the first association relationship between the session identifier and the virtual interface information in the following two manners.

Manner 1: When the AS parameter sent by the 5G-RG to the AGF-CP includes the virtual interface information corresponding to the session establishment request, the AGF-CP obtains the virtual interface information from the AS parameter, and establishes the first association relationship between the session identifier and the virtual interface information.

Manner 2: When the AS parameter sent by the 5G-RG to the AGF-CP includes the first information, because a second association relationship between the first information and the virtual interface information is preconfigured on the AGF-CP, the AGF-CP obtains the first information from the AS parameter, and determines, based on the second mapping relationship, the virtual interface information corresponding to the first information, to establish the first association relationship between the session identifier and the virtual interface information.

Step 304: The AGF-CP sends the session identifier and the virtual interface information corresponding to the session identifier to the 5G-RG.

Specifically, the AGF-CP may send, to the 5G-RG, an AS parameter carrying the session identifier and the virtual interface information corresponding to the session identifier, to notify the 5G-RG of the association relationship between the session identifier and the virtual interface information.

Step 305: The 5G-RG receives the session identifier and the virtual interface information corresponding to the session identifier from the AGF-CP.

Optionally, the 5G-RG further stores the first association relationship between the session identifier and the virtual interface information.

In a possible implementation, if an initial association relationship between a session identifier and virtual interface information is preconfigured on the 5G-RG, after the 5G-RG receives the session identifier and the virtual interface information corresponding to the session identifier from the AGF-CP, the 5G-RG compares whether the virtual interface information in the initial association relationship is the same as the received virtual interface information. If the virtual interface information in the initial association relationship is different from the received virtual interface information, it indicates that the AGF reallocates new virtual interface information to the session. Therefore, the 5G-RG updates the virtual interface information in the initial association relationship based on the virtual interface information in the first association relationship.

Further, after the AGF and the 5G-RG establish the first association relationship between the session identifier corresponding to the established session and the virtual interface information, the AGF and the 5G-RG may implement, based on the first association relationship, that a connection between the 5G-RG and the AGF one-to-one corresponds to a quality of service flow of a PDU session. This implements an end-to-end user plane connection between the 5G-RG and the AGF. The following describes uplink packet and downlink packet transmission processes.

Figure 4A:
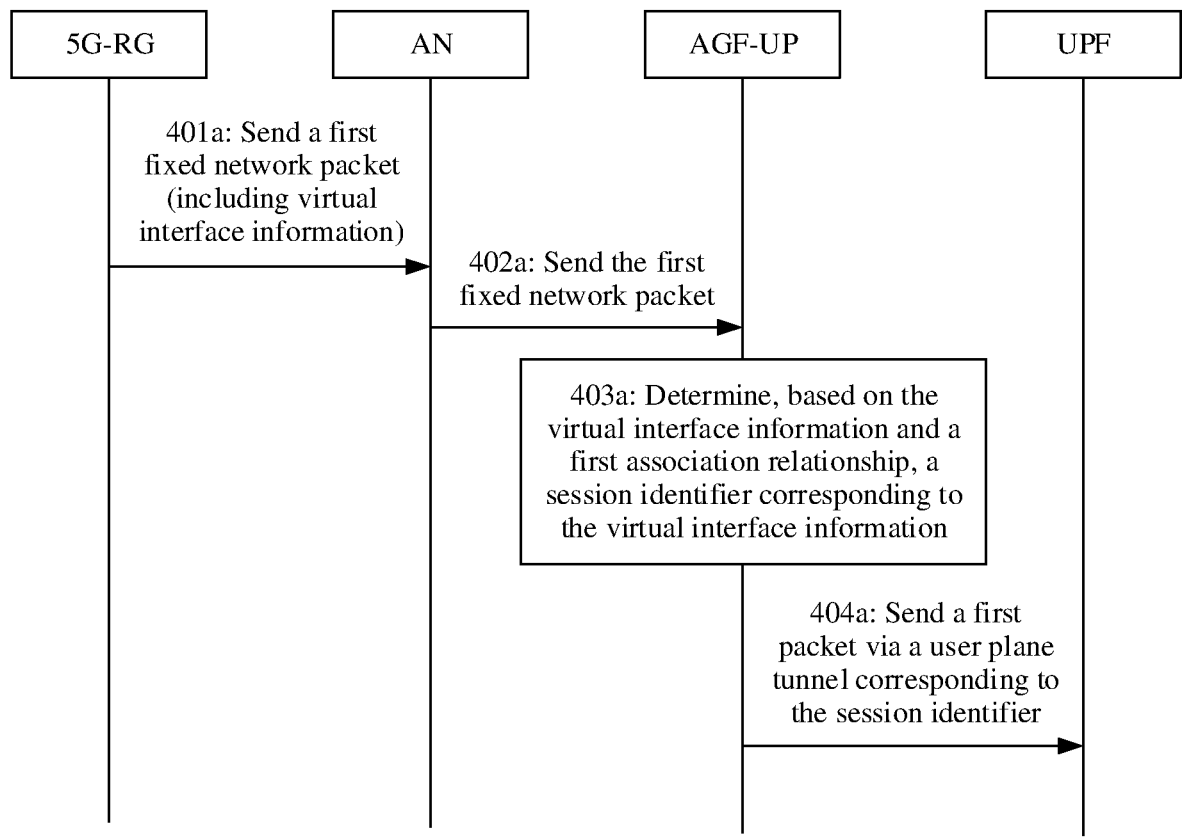
FIG. 4A and FIG. 4B show a packet sending method according to this disclosure.

Based on the session established according to the foregoing method, the terminal may perform uplink and downlink data transmission. Refer to FIG. 4A for the uplink packet transmission process. The following steps may be specifically included.

Step 401a: A 5G-RG sends a first packet carried in a first fixed network session to an AN.

The first packet includes virtual interface information. The first fixed network session is the first session established according to the steps described in FIG. 3.

It should be noted that different fixed network access manners may be used between the 5G-RG and the AN. For the different fixed network access manners, there is an implementation of a virtual interface between the 5G-RG and the AN, so that the AN can identify a service type of a packet based on virtual interface information in a received packet.

Step 402a: After the AN receives the first packet that is from the 5G-RG and that is carried in the first fixed network session, the AN sends the first packet to an AGF-UP.

Step 403a: After the AGF-UP receives the first packet from the AN, the AGF-UP determines, based on the virtual interface information and a first association relationship, a session identifier corresponding to the virtual interface information.

Step 404a: The AGF-UP sends the first packet to a UPF via a user plane tunnel corresponding to the session identifier, where the user plane tunnel is a transmission channel between the AGF-UP and the UPF.

Figure 4B:
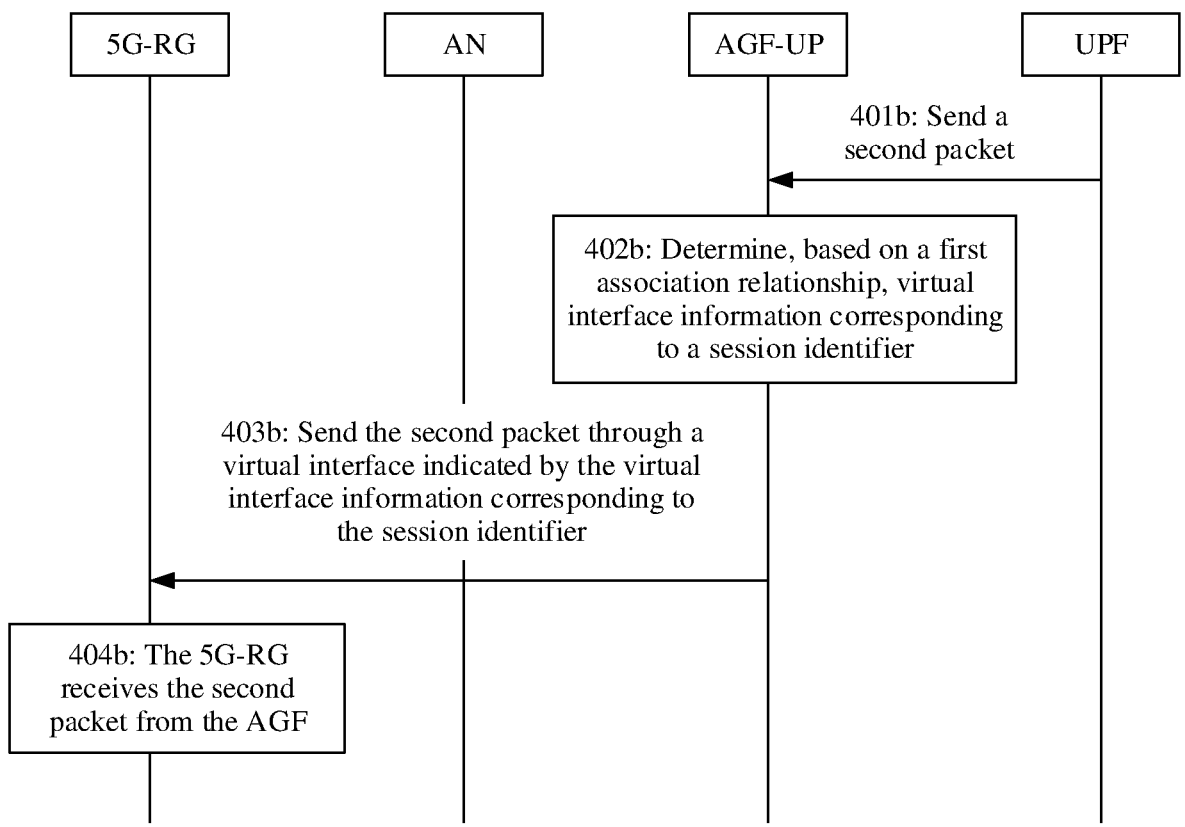

Refer to FIG. 4B for the downlink packet transmission process. The following steps may be specifically included.

Step 401b: An AGF-UP receives, from a UPF network element, a second packet carried in a first fixed network session, where the second packet includes a user plane tunnel identifier of the user plane function network element.

The first fixed network session is the session established according to the steps described in FIG. 3.

Step 402b: After receiving the second packet, the AGF-UP determines, based on a first association relationship and a session identifier corresponding to the first fixed network session, virtual interface information corresponding to a session identifier corresponding to the user plane tunnel identifier.

Step 403b: The AGF-UP sends the second packet to a 5G-RG through a virtual interface indicated by the virtual interface information corresponding to the session identifier.

In other words, the AGF-UP encapsulates the second packet based on the virtual interface information corresponding to the session identifier, and sends the encapsulated second packet to the 5G-RG.

Step 404b: The 5G-RG receives the second packet from the AGF.

In conclusion, based on the first association relationship, a connection between the 5G-RG and the AGF one-to-one corresponds to a quality of service flow of a PDU session. This implements an end-to-end user plane connection between the 5G-RG and the AGF, and ensures end-to-end quality of service.

Embodiment 2

Figure 5A:
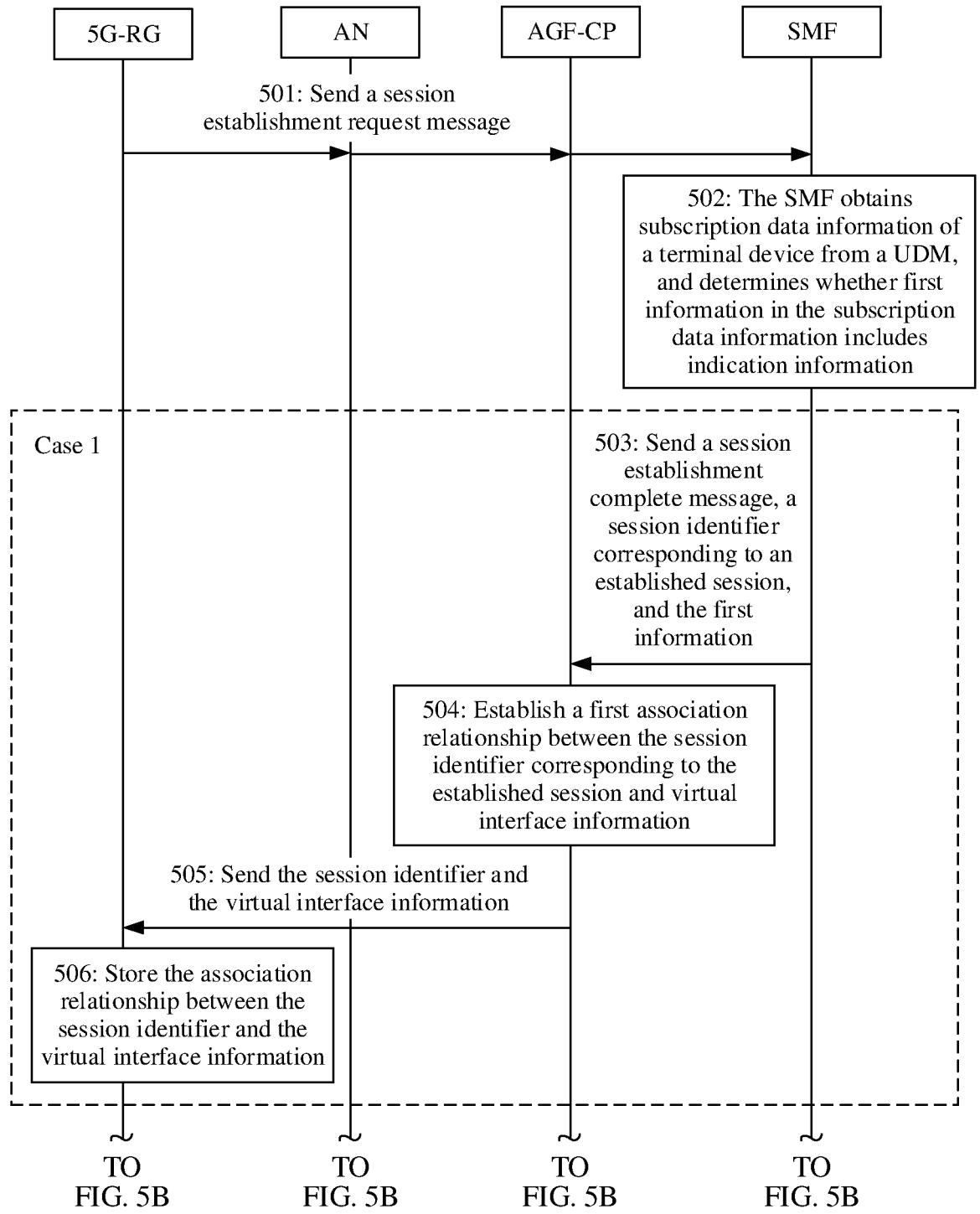
FIG. 5A and FIG. 5B are a schematic flowchart of a second session establishment method according to this disclosure.
Figure 5B:
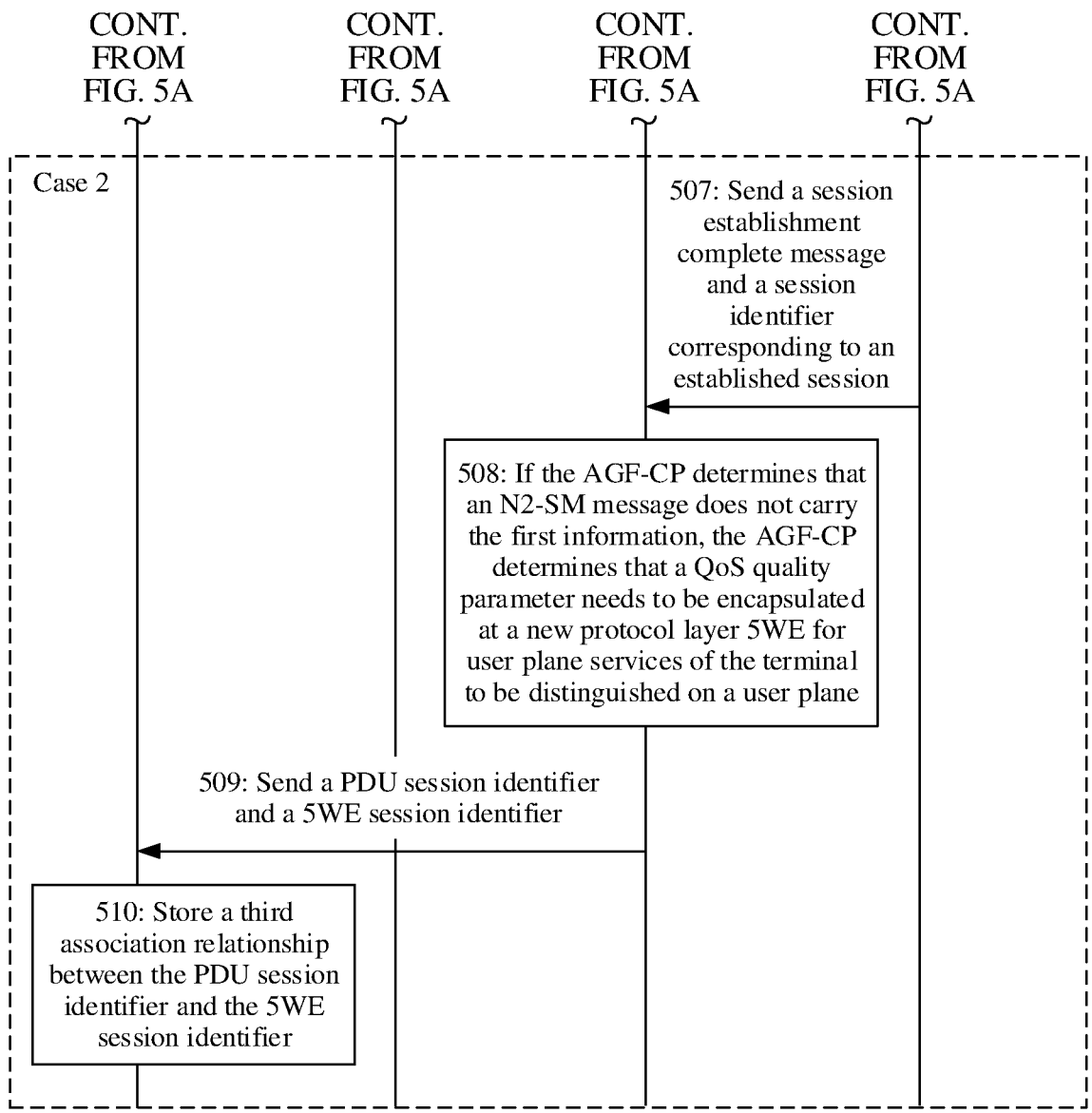

FIG. 5A and FIG. 5B are a schematic flowchart of a second session establishment method according to this disclosure. Specifically, the method may include the following steps.

Step 501: A 5G-RG sends a session establishment request message to an SMF via an AGF-CP.

The session establishment request message is for requesting to establish or modify a first session, and may be a non-access stratum (NAS) message. The NAS message includes a PDU session establishment request message for requesting to establish a PDU session.

Step 502: The SMF obtains subscription data of a terminal from a UDM, and determines whether first information in the subscription data includes indication information.

If the indication information is configured in the first information, step 503 to step 506 corresponding to the following case 1 are performed. If the indication information is not configured in the first information, step 507 to step 510 corresponding to the following case 2 are performed.

The first information may be at least one of DNN information and network handover information (for example, S-NSSAI). For example, it is preconfigured on the UDM that some DNNs have indication information, but some DNNs do not have indication information. If the indication information is configured in the DNN, the indication information indicates the SMF to include the DNN in N2 SM information when generating the N2 session management (SM) information. If the indication information is not configured in the DNN, the SMF does not need to include the DNN in N2 SM information. For another example, it is preconfigured on the UDM that some S-NSSAI has indication information, but some S-NSSAI does not have indication information. If the indication information is configured in the S-NSSAI, the indication information indicates the SMF to include the S-NSSAI in N2 SM information when generating the N2 SM information. If the indication information is not configured in the S-NSSAI, the SMF does not need to include the S-NSSAI in N2 SM information.

It should be noted that, in another possible case, if a message obtained by the SMF from a PCF includes indication information, the SMF needs to include a DNN/S-NSSAI in N2 SM information; or if a message obtained by the SMF from a PCF does not include indication information, the SMF does not need to include a DNN/S-NSSAI in N2 SM information.

The indication information may be access location information or an access technology indication. For example, the access location information is a line identifier (line ID). The access technology indication is a wired access technology indication.

Case 1

Step 503: The SMF completes an operation related to session establishment on a core network control plane, and then sends a session establishment complete message, a session identifier of the established session, and the first information to the AGF-CP.

The session identifier of the established session may be a PDU session identifier (PDU session ID). Further, the session establishment complete message may further include tunnel information of a UPF corresponding to the established session, for example, include a general packet radio service (GPRS) tunneling protocol—user plane (GTP-U) and/or a tunnel endpoint identifier (TEID).

The SMF may send the session identifier of the established session and the first information to the AGF-CP via the N2-SM information. In addition, the N2-SM information may further include session parameter information such as a QFI, a quality of service flow profile, CN tunnel information, and a PDU session type.

Step 504: The AGF-CP receives the session identifier of the established session and the first information from the SMF network element, and establishes a first association relationship between the session identifier and virtual interface information.

Specifically, because a second association relationship between the first information and the virtual interface information is preconfigured on the AGF-CP, the AGF-CP obtains the first information from the N2-SM information, and determines, based on the second association relationship, the virtual interface information corresponding to the first information, to establish the first association relationship between the session identifier and the virtual interface information.

For example, if the AGF-CP obtains the PDU session identifier and the DNN from the N2-SM information, the AGF-CP determines that a user plane service of the terminal needs to be distinguished based on the virtual interface information as a service identifier. Therefore, the AGF-CP generates a user plane AS parameter based on the PDU session identifier, the DNN, and a preconfigured association relationship between a DNN and a VLAN ID, where the user plane AS parameter includes the PDU session identifier and a VLAN ID corresponding to the PDU session identifier.

Step 505: The AGF-CP sends the session identifier and the virtual interface information corresponding to the session identifier to the 5G-RG.

Specifically, the AGF-CP may send, to the 5G-RG, an AS parameter carrying the session identifier and the virtual interface information corresponding to the session identifier, to notify the 5G-RG of the association relationship between the session identifier and the virtual interface information.

Step 506: The 5G-RG receives the session identifier and the virtual interface information corresponding to the session identifier from the AGF-CP, and stores the association relationship between the session identifier and the virtual interface information.

Further, after the 5G-RG and the AGF establish the association relationship between the session identifier and the virtual interface information, uplink packet and downlink packet transmission may be completed according to the processes shown in FIG. 4A and FIG. 4B. For details, refer to the foregoing descriptions. Details are not described herein again.

In case 1, based on the first association relationship, a connection between the 5G-RG and the AGF one-to-one corresponds to a quality of service flow of a PDU session. This implements an end-to-end user plane connection between the 5G-RG and the AGF, and ensures end-to-end quality of service. In addition, a fixed network distinguishes between user plane services based on virtual interface information, so that a fixed network service can smoothly evolve to a 5G system with better compatibility.

Case 2

Step 507: The SMF completes an operation related to session establishment on a core network control plane, and then sends a session establishment complete message and a session identifier of the established session to the AGF-CP.

Step 508: If the AGF-CP determines that N2-SM information does not carry the first information, the AGF-CP determines that a QoS quality parameter (such as a PDU session ID, a QFI, and an RQI) needs to be encapsulated at a new protocol layer 5WE for user plane services of the terminal to be distinguished on a user plane. To be specific, the AGF generates a user plane AS parameter, where the user plane AS parameter includes the PDU session identifier and a 5WE session identifier corresponding to the PDU session identifier.

During specific implementation, a 5WE header is externally encapsulated for a user plane data packet sent by the 5G-RG, and the 5WE header may carry the PDU session ID, the QFI, the RQI, and the like. After the AGF receives the user plane data packet sent by the 5G-RG, the AGF may identify a corresponding PDU session based on the PDU session ID, the QFI, and the RQI in the 5WE header, and send the user plane data packet to a UPF network element via user plane tunnel information corresponding to the PDU session.

Step 509: The AGF-CP sends, to the 5G-RG, the PDU session identifier and the 5WE session identifier corresponding to the PDU session identifier.

Specifically, the AGF-CP may notify, via the user plane AS parameter, the 5G-RG of the PDU session identifier and the 5WE session identifier corresponding to the PDU session identifier.

Step 510: The 5G-RG receives the PDU session identifier and the 5WE session identifier from the AGF-CP, and stores a third association relationship between the PDU session identifier and the 5WE session identifier.

In conclusion, if a DNN or S-NSSAI has corresponding indication information, it indicates that the 5G-RG needs to establish a PDU session to the DNN by using a VLAN ID for user plane differentiation. If a DNN/S-NSSAI does not have corresponding indication information, it indicates that the 5G-RG needs to establish a PDU session to the DNN by using 5WE for user plane differentiation. A same 5G-RG may perform user plane transmission in different manners based on a service scenario.

Embodiment 3

Figure 6A:
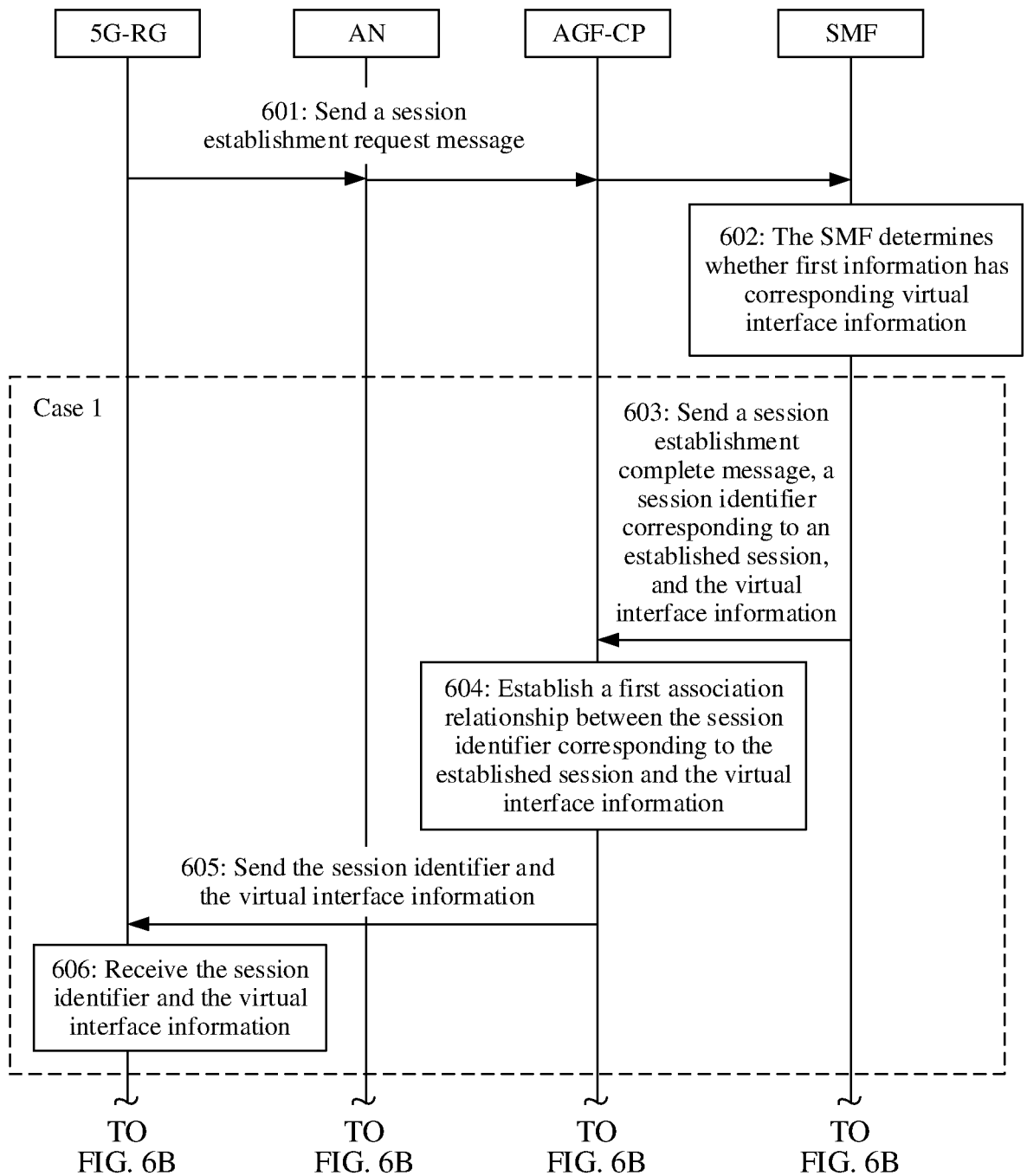
FIG. 6A and FIG. 6B are a schematic flowchart of a third session establishment method according to this disclosure.
Figure 6B:
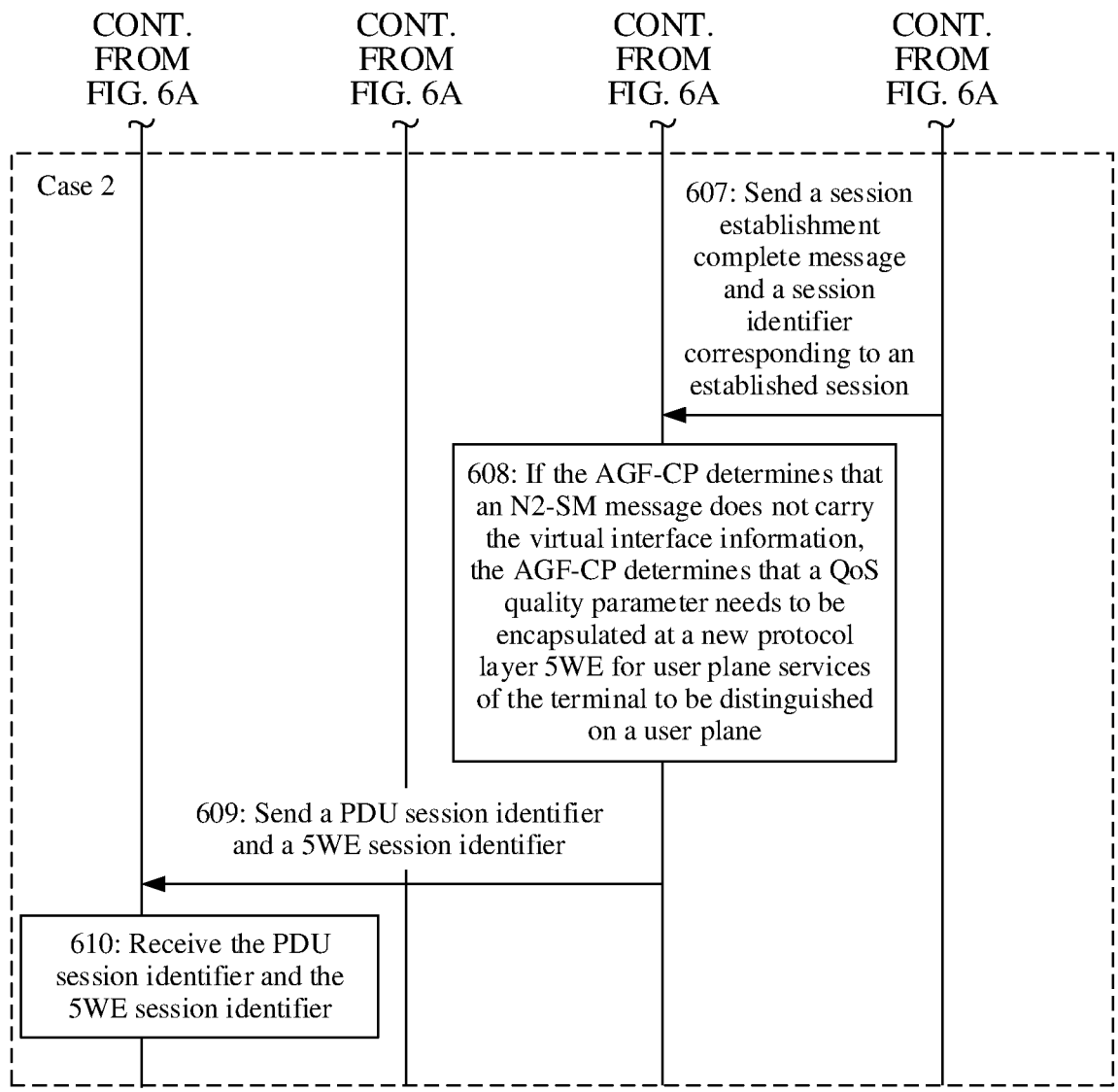

FIG. 6A and FIG. 6B are a schematic flowchart of a third session establishment method according to this disclosure. Specifically, the method may include the following steps.

Step 601: A 5G-RG sends a session establishment request message to an SMF via an AGF-CP, where the session establishment request message is for requesting to establish or modify a first session.

The session establishment message may be a non-access stratum (NAS) message, and the NAS message includes a PDU session establishment request message for requesting to establish a PDU session.

Step 602: The SMF determines whether first information is bound to corresponding virtual interface information.

Specifically, the SMF obtains subscription data of a terminal from a UDM, and determines whether the first information in the subscription data is bound to the corresponding virtual interface information. Alternatively, the SMF determines, from a local configuration policy, whether the first information is bound to the corresponding virtual interface information. Alternatively, the SMF determines, from policy information received from a PCF, whether the first information is bound to the corresponding virtual interface information.

If the first information is bound to the corresponding virtual interface information, step 603 to step 606 corresponding to the following case 1 are performed. If the first information is not bound to the corresponding virtual interface information, step 607 to step 610 corresponding to the following case 2 are performed.

The first information may be DNN information or network handover information (for example, S-NSSAI). For example, it is preconfigured on the UDM that some DNNs are bound to corresponding virtual interface information, but some DNNs are not bound to virtual interface information. If the DNN is bound to the corresponding virtual interface information, the SMF may include the virtual interface information in N2 SM information when generating the N2 SM information. If the DNN is not bound to the virtual interface information, the SMF does not include the virtual interface information in N2 SM information. For another example, it is preconfigured on the UDM that some S-NS-SAI is bound to corresponding virtual interface information, but some S-NSSAI is not bound to virtual interface information. If the S-NSSAI is bound to the corresponding virtual interface information, the SMF may include the virtual interface information in N2 SM information when generating the N2 SM information. If the S-NSSAI is not bound to the virtual interface information, the SMF does not include the virtual interface information in N2 SM information.

Case 1

Step 603: The SMF completes an operation related to session establishment on a core network control plane, and then sends a session establishment complete message, a session identifier of the established session, and the virtual interface information to the AGF-CP.

The session identifier of the established session may be a PDU session identifier (PDU session ID). Further, the session establishment complete message may further include tunnel information of a UPF corresponding to the established session, for example, include a general packet radio service (GPRS) tunneling protocol-user plane (GTP-U) and/or a tunnel endpoint identifier (TEID).

The SMF may send the session identifier of the established session and the first information to the AGF-CP via the N2-SM information. In addition, the N2-SM information may further include session parameter information such as a QFI, a quality of service flow profile (QoS profile), CN tunnel information , and a PDU session type.

Step 604: The AGF-CP receives the session identifier of the established session and the virtual interface information from the SMF network element, and establishes a first association relationship between the session identifier and the virtual interface information.

Step 605: The AGF-CP sends the session identifier and the virtual interface information corresponding to the session identifier to the 5G-RG.

Specifically, the AGF-CP may send, to the 5G-RG, an AS parameter carrying the session identifier and the virtual interface information corresponding to the session identifier, to notify the 5G-RG of the association relationship between the session identifier and the virtual interface information.

Step 606: The 5G-RG receives the session identifier and the virtual interface information corresponding to the session identifier from the AGF-CP.

Optionally, the 5G-RG stores the first association relationship between the session identifier and the virtual interface information corresponding to the session identifier.

Further, after the 5G-RG and the AGF establish the first association relationship, uplink packet and downlink packet transmission may be completed according to the processes shown in FIG. 4A and FIG. 4B. For details, refer to the foregoing descriptions. Details are not described herein again.

In case 1, based on the first association relationship, a connection between the 5G-RG and the AGF one-to-one corresponds to a quality of service flow of a PDU session. This implements an end-to-end user plane connection between the 5G-RG and the AGF, and ensures end-to-end quality of service. In addition, a fixed network distinguishes between user plane services based on virtual interface information, so that a fixed network service can smoothly evolve to a 5G system with better compatibility.

Case 2

Step 607: The SMF completes an operation related to session establishment on a core network control plane, and then sends a session establishment complete message and a session identifier of the established session to the AGF-CP.

Step 608: If the AGF-CP determines that N2-SM information does not carry the virtual interface information, the AGF-CP determines that a QoS quality parameter (such as a PDU session ID, a QFI, and an RQI) needs to be encapsulated at a new protocol layer 5WE for user plane services of the terminal to be distinguished on a user plane. To be specific, the AGF generates a user plane AS parameter, where the user plane AS parameter includes the PDU session identifier and a 5WE session identifier corresponding to the PDU session identifier.

During specific implementation, a 5WE header is externally encapsulated for a user plane data packet sent by the 5G-RG, and the 5WE header may carry the PDU session ID, the QFI, the RQI, and the like. After the AGF receives the user plane data packet sent by the 5G-RG, the AGF may identify a corresponding PDU session based on the PDU session ID, the QFI, and the RQI in the 5WE header, and send the user plane data packet to a UPF network element via user plane tunnel information corresponding to the PDU session.

Step 609: The AGF-CP sends a third association relationship to the 5G-RG, where the third association relationship includes the PDU session identifier and the 5WE session identifier corresponding to the PDU session identifier.

Specifically, the AGF-CP may notify, via the user plane AS parameter, the 5G-RG of the PDU session identifier and the 5WE session identifier corresponding to the PDU session identifier.

Step 610: The 5G-RG receives the 5WE session identifier corresponding to the PDU session identifier.

Optionally, the 5G-RG stores an association relationship between the PDU session identifier and the 5WE session identifier corresponding to the PDU session identifier.

In conclusion, if a DNN/S-NSSAI has a corresponding VLAN ID, it indicates that the 5G-RG needs to establish a PDU session to the DNN by using a VLAN ID for user plane differentiation. If a DNN/S-NSSAI does not have a corresponding VLAN ID, it indicates that the 5G-RG needs to establish a PDU session to the DNN by using 5WE for user plane differentiation. A same 5G-RG may perform user plane transmission in different manners based on a service scenario.

Embodiment 4

Figure 7:
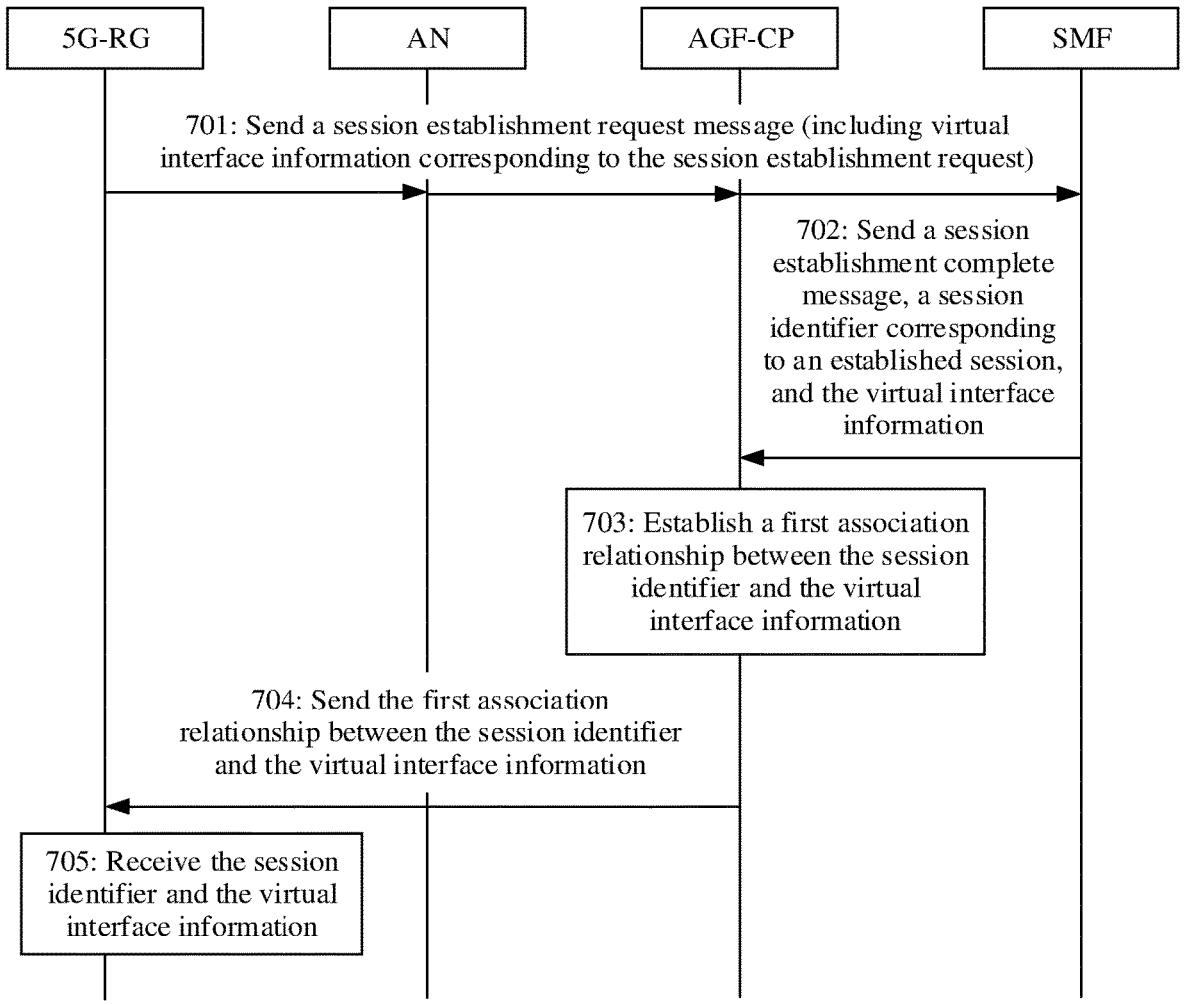
FIG. 7 is a schematic flowchart of a fourth session establishment method according to this disclosure.

FIG. 7 is a schematic flowchart of a fourth session establishment method according to this disclosure. Specifically, the method may include the following steps.

Step 701: A 5G-RG sends a session establishment request message to an SMF via an AGF-CP, where the session establishment request message includes virtual interface information, and the session establishment request message is for requesting to establish or modify a first session.

The session establishment message may be a non-access stratum (NAS) message. The NAS message includes a PDU session establishment request message for requesting to establish a PDU session. Alternatively, the NAS message includes a PDU session modification request message for requesting to establish a PDU session. For example, when initiating a PDU session, the 5G-RG directly extends a PDU session establishment/modification request for carrying a VLAN ID.

Step 702: The SMF sends a session establishment complete message, a session identifier corresponding to the established session, and the virtual interface information to the AGF-CP.

Specifically, after receiving the session establishment message from the AGF-CP, the SMF completes an operation related to session establishment on a core network control plane, and then the SMF sends the session establishment complete message and the session identifier of the established session to the AGF-CP via an AMF.

The session identifier of the established session may be a PDU session identifier (PDU session ID). Further, the session establishment complete message may further include tunnel information of a UPF corresponding to the established session, for example, include a general packet radio service (GPRS) tunneling protocol—user plane (GTP-U) and/or a tunnel endpoint identifier (TEID).

Step 703: The AGF-CP establishes a first association relationship between the session identifier and the virtual interface information based on the session identifier corresponding to the established session and the virtual interface information that are from the SMF.

Step 704: The AGF-CP sends the first association relationship to the 5G-RG.

Specifically, the AGF-CP may send, to the 5G-RG, an AS parameter carrying the session identifier and the virtual interface information corresponding to the session identifier, to notify the 5G-RG of the association relationship between the session identifier and the virtual interface information.

Step 705: The 5G-RG receives the session identifier and the virtual interface information corresponding to the session identifier from the AGF-CP.

Optionally, the 5G-RG stores the first association relationship between the session identifier and the virtual interface information.

In this embodiment, the PDU session establishment/modification request is extended for carrying the virtual interface information. Therefore, in a session establishment process, the AGF and the 5G-RG establish the first association relationship between the session identifier corresponding to the established session and the virtual interface information. Subsequently, the AGF and the 5G-RG may use the first association relationship, so that a connection between the 5G-RG and the AGF one-to-one corresponds to a quality of service flow of a PDU session, implementing an end-to-end user plane connection between the 5G-RG and the AGF. After the 5G-RG and the AGF establish the first association relationship, uplink packet and downlink packet transmission may be completed according to the processes shown in FIG. 4A and FIG. 4B. For details, refer to the foregoing descriptions. Details are not described herein again.

Embodiment 5

Figure 8:
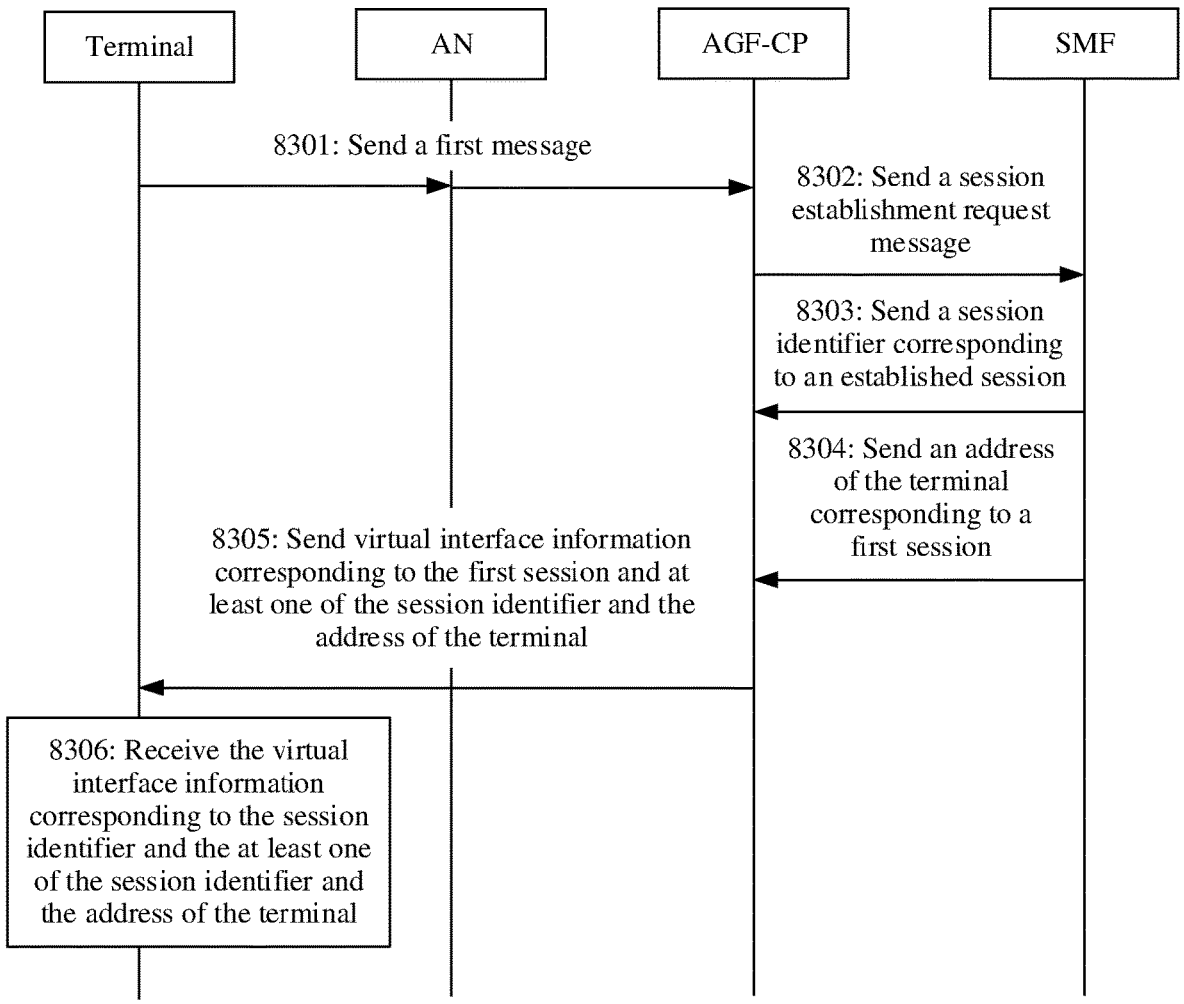
FIG. 8 is a schematic flowchart of a second session establishment method according to this disclosure.

FIG. 8 is a schematic flowchart of another session establishment method according to this disclosure. Specifically, the method may include the following steps.

Step 8301: A terminal sends a first message to an AGF-CP, where the first message is for requesting to establish or modify a first session.

The terminal may be a 5G-RG or an FN-RG. In a possible case, if the terminal is the 5G-RG, the first message is a NAS message generated by the 5G-RG, and the NAS message may be a PDU session establishment request message or a PDU session modification request message. In other words, the 5G-RG notifies, via the NAS message, an SMF to establish a PDU session. In this step, the 5G-RG may first send the NAS message to an AN, where the NAS message is for requesting to establish or modify the PDU session, and then the AN forwards the NAS message to the AGF-CP. The AN does not parse specific content in the NAS message, but directly forwards the received NAS message to the AGF-CP instead.

In addition, the 5G-RG further sends an access stratum (AS) parameter to the AGF-CP, and the AS parameter includes virtual interface information or first information. The first information may include at least one of network slice information and DNN information. The virtual interface information is an identifier of a virtual interface between the 5G-RG (or the FN-RG) and the AGF, and the identifier of the virtual interface can be used to distinguish between virtual channel information of a fixed network service. For example, the virtual interface information may be virtual path identifier (VPI) or virtual channel identifier (VCI) information in a digital subscriber line (DSL), a virtual local area network (VLAN) ID accessed by the ethernet, or the like. For example, the following uses an example in which the virtual interface information is the VLAN ID for description. In addition, the virtual interface identifier may be sent via an L2 packet header, that is, the L2 packet header carries the virtual interface information. The NAS message and the AS parameter may be sent to the AGF-CP at the same time, that is, an L2 message includes both the NAS message and the AS parameter. Optionally, the L2 packet header in which the L2 message is encapsulated includes the virtual interface identifier.

In another possible case, if the terminal is the FN-RG, the first message may be a DHCP discovery, a DHCP request message, a PPPoE PADI, or an IPCP/IPv6CP configuration request message generated by the FN-RG, or any message in a DHCP procedure or a PPPoE procedure, that is, the FN-RG initiates the DHCP procedure or the PPPoE procedure to the AGF-CP, to establish a connection between the FN-RG and the AGF-CP.

In addition, the FN-RG may further send first information or virtual interface information to the AGF-CP, and the first information or the virtual interface information may be carried in a same message. For example, the first message is carried in an L2 packet header, and the L2 packet header may include the virtual interface information or the first information. It should be understood that a correspondence between a service type (for example, a fixed network service) and virtual interface information, or a correspondence between a service type and first information is preconfigured on the FN-RG. In this way, the FN-RG may first determine virtual interface information corresponding to a to-be-transmitted fixed network service, or determine first information corresponding to a to-be-transmitted fixed network service, to include the virtual interface information or the first information in the L2 packet header.

It should be understood that, in a possible implementation, the 5G-RG or the FN-RG may obtain policy information from a PCF network element, and the policy information includes the virtual interface information. Optionally, the policy information further includes a correspondence between a service type (or a service identifier) and virtual interface information.

In another possible implementation, the 5G-RG or the FN-RG may alternatively obtain policy information from a PCF network element, and the policy information includes the first information. Optionally, the policy information further includes a correspondence between a service type (or a service identifier) and first information. The service type is, for example, a web television service, a video service, a voice service, or a data service, and the service identifier is, for example, a service ID. In this way, the 5G-RG or the FN-RG may first determine virtual interface information corresponding to a to-be-transmitted fixed network service, or determine first information corresponding to a to-be-transmitted fixed network service, to send the virtual interface information or the first information to the AGF-CP.

Step 8302: The AGF-CP sends a session establishment request message to the SMF, where the session establishment request message is for requesting to establish or modify the first session.

In a possible case, when the terminal is the 5G-RG, the session establishment request message is a non-access stratum (NAS) message, and the NAS message may be a PDU session establishment request message or a PDU session modification request message. In other words, the 5G-RG notifies, via the NAS message, the SMF to establish the PDU session. After the AGF-CP receives the NAS message from the 5G-RG, the AGF-CP forwards the NAS message to an AMF. After receiving the session establishment message from the AGF-CP, the AMF continues to forward the NAS message to the SMF, that is, notifies the SMF to complete an operation related to session establishment on a core network control plane. In this process, the AGF-CP does not parse specific content in the NAS message, but directly forwards the received NAS message instead.

In another possible case, when the terminal is the FN-RG, the AGF-CP generates a NAS message based on the first message (for example, any one of the DHCP discovery, the DHCP request message, the PPPoE PADI, or the IPCP/IPv6CP configuration request message) sent by the FN-RG, and then forwards the NAS message to an AMF. The NAS message may be a PDU session establishment request message or a PDU session modification request. After receiving the session establishment message from the AGF-CP, the AMF continues to forward the NAS message to the SMF, that is, notifies the SMF to complete an operation related to session establishment on a core network control plane.

Step 8303: The SMF sends a session identifier corresponding to the established session to the AGF-CP.

Specifically, after receiving the NAS message from the AGF-CP, the SMF completes the operation related to the session establishment on the core network control plane. Then, the SMF sends an N2 message to the AGF-CP via the AMF, where the N2 message includes the session identifier of the established first session. The session identifier of the established session may be a PDU session identifier (PDU session ID).

Optionally, the N2 message may further include tunnel information of a UPF corresponding to the established first session, for example, include a general packet radio service (GPRS) tunneling protocol-user plane (GTP-U) and/or a tunnel endpoint identifier (TEID).

In a possible embodiment, the SMF may further send the first information to the AGF-CP, where the first information is the DNN information and/or the network slice information of the first session corresponding to the session identifier. In other words, after receiving the NAS message from the AGF-CP, the SMF completes the operation related to the session establishment on the core network control plane, and then the SMF sends the N2 message to the AGF-CP via the AMF, where the N2 message includes the session identifier of the established session and the first information.

In another possible embodiment, the SMF may further send virtual interface information corresponding to the first session to the AGF-CP. In other words, after receiving the NAS message from the AGF-CP, the SMF completes the operation related to the session establishment on the core network control plane, and then the SMF sends the N2 message to the AGF-CP via the AMF, where the N2 message includes the session identifier of the established session and the virtual interface information corresponding to the first session.

Step 8304: The SMF sends, to the AGF-CP, an address of the terminal corresponding to the first session.

It should be noted that step 8304 and step 8303 may be separately performed as two steps; or may be performed as a single step, that is, parameters in step 8304 and step 8303 are carried in a single procedure.

The address of the terminal is an address of the terminal that is allocated by a network side to the first session. For example, the address of the terminal may be an IP address of the terminal allocated by the network side to the first session. The address of the terminal may be carried in a response message of the NAS message. For example, the response message of the NAS message may be a PDU session establishment accept message or a PDU session modification command message. The response message further includes the session identifier (for example, the PDU session ID). The address of the terminal may be allocated by the SMF, or may be allocated by the UPF.

Step 8305: The AGF-CP sends, to the terminal, the virtual interface information corresponding to the first session and at least one of the session identifier and the address of the terminal.

In other words, after the SMF sends the PDU session establishment accept message or the PDU session modification command message to the AGF-CP, in a possible case, when the terminal is the 5G-RG, the AGF-CP directly forwards the PDU session establishment accept message or the PDU session modification command message to the 5G-RG. The message includes the session identifier, or may further include the address of the terminal allocated by the network side to the terminal. In this process, the AGF-CP does not parse specific content in the response message, but forwards the received response message, where the response message includes the session identifier and the address of the terminal. In addition, the AGF-CP sends the virtual interface information corresponding to the session identifier to the terminal via an AS parameter. To be specific, the AGF-CP notifies the 5G-RG of an association relationship between the virtual interface information and the at least one of the session identifier and the address of the terminal.

In another possible case, when the terminal is the FN-RG, the AGF-CP parses a PDU session establishment accept message or a PDU session modification command message to obtain the address of the terminal and the session identifier (for example, the PDU session ID), and sends the address of the terminal to the FN-RG via a DHCP response (for example, a DHCP response or a DHCP ACK) message or an IP configuration response (for example, an IPCP/IPv6CP configuration response or an IPCP/IPv6CP configuration ACK) message. In addition, the AGF-CP may send the virtual interface information corresponding to the session identifier to the FN-RG via an L2 packet header, that is, the AGF-CP notifies the FN-RG of an association relationship between the address of the terminal and the virtual interface information.

In a possible embodiment, in step 8304, the AGF-CP may further establish the association relationship between the virtual interface information and the at least one of the session identifier and the address of the terminal. For specific establishment manners, refer to the following manners.

Manner A: In a possible implementation, the AGF-CP may establish a first association relationship between the virtual interface information and the at least one of the session identifier and the address of the terminal based on the virtual interface information received in step 8301 and the at least one of the session identifier and the address of the terminal that are received from the SMF, and then send the session identifier and/or the address of the terminal and the virtual interface information corresponding to the session identifier to the terminal.

Manner B: In another possible implementation, after receiving the first message from the terminal, the AGF-CP reallocates target virtual interface information to the terminal based on the first information in the first message, and the AGF-CP may establish a first association relationship between the session identifier and the target virtual interface information based on the reallocated target virtual interface information and the session identifier and/or the address of the terminal received from the SMF, and then the AGF-CP sends the virtual interface information corresponding to the session identifier and the at least one of the session identifier and the address of the terminal to the terminal.

Manner C: In another possible implementation, the AGF-CP determines, based on the first information received from the terminal and a correspondence between the first information and virtual interface information that is stored by the AGF-CP, virtual interface information corresponding to the first information, and the AGF-CP may establish a first association relationship between the virtual interface information and the at least one of the session identifier and the address of the terminal based on the virtual interface information corresponding to the first information, and the session identifier and/or the address of the terminal received from the SMF, and then the AGF-CP sends the virtual interface information corresponding to the session identifier and the at least one of the session identifier and the address of the terminal to the terminal.

Manner D: In still another possible implementation, if the AGF-CP receives the first information from the SMF, the AGF-CP may determine, based on the first information from the SMF and a correspondence between the first information and virtual interface information that is stored by the AGF-CP, virtual interface information corresponding to the first information, and the AGF-CP may establish an association relationship between the virtual interface information and the at least one of the session identifier and the address of the terminal based on the virtual interface information corresponding to the first information, and the session identifier and/or the address of the terminal received from the SMF, and then the AGF-CP sends the virtual interface information corresponding to the session identifier and the at least one of the session identifier and the address of the terminal to the terminal.

Manner E: In still another possible implementation, if the AGF-CP receives the virtual interface information corresponding to the first session from the SMF, the AGF-CP may establish an association relationship between the session identifier and the virtual interface information based on the virtual interface information corresponding to the first session, and the session identifier and/or the address of the terminal received from the SMF in step 8303, and then the AGF-CP sends the virtual interface information corresponding to the session identifier and the at least one of the session identifier and the address of the terminal to the terminal.

Step 8306: The terminal receives the virtual interface information corresponding to the session identifier and the at least one of the session identifier and the address of the terminal from the AGF-CP.

In a possible implementation, if the terminal is the 5G-RG, the 5G-RG may obtain the address of the terminal and the session identifier (for example, the PDU session ID)

from the PDU session establishment accept message or the PDU session modification command message from the AGF-CP, so that the 5G-RG may locally store an association relationship between the session identifier of the terminal, the address of the terminal, and the virtual interface information.

In another possible implementation, if the terminal is the FN-RG, the FN-RG may receive the address of the terminal and the virtual interface information from the AGF-CP, to establish an association relationship between the address of the terminal and the virtual interface information.

In a possible implementation, if an initial association relationship between a session identifier and virtual interface information is preconfigured on the 5G-RG or the FN-RG, after the 5G-RG or the FN-RG receives the session identifier and the virtual interface information corresponding to the session identifier from the AGF-CP, the 5G-RG or the FN-RG may compare whether the virtual interface information in the initial association relationship is the same as the received virtual interface information. If the virtual interface information in the initial association relationship is different from the received virtual interface information, it indicates that the AGF reallocates new virtual interface information to the session. Therefore, the 5G-RG or the FN-RG updates the virtual interface information in the initial association relationship based on the virtual interface information in the first association relationship.

In a possible implementation, after the AGF and the 5G-RG (or the FN-RG) establish the association relationship between the virtual interface information corresponding to the established session and/or the address of the terminal and the session identifier, the AGF and the 5G-RG (or the FN-RG) may implement, based on the association relationship, that a connection between the 5G-RG (or the FN-RG) and the AGF one-to-one corresponds to a quality of service flow of a PDU session. This implements an end-to-end user plane connection between the 5G-RG (or the FN-RG) and the AGF. The following describes uplink packet and downlink packet transmission processes.

Figure 9A:
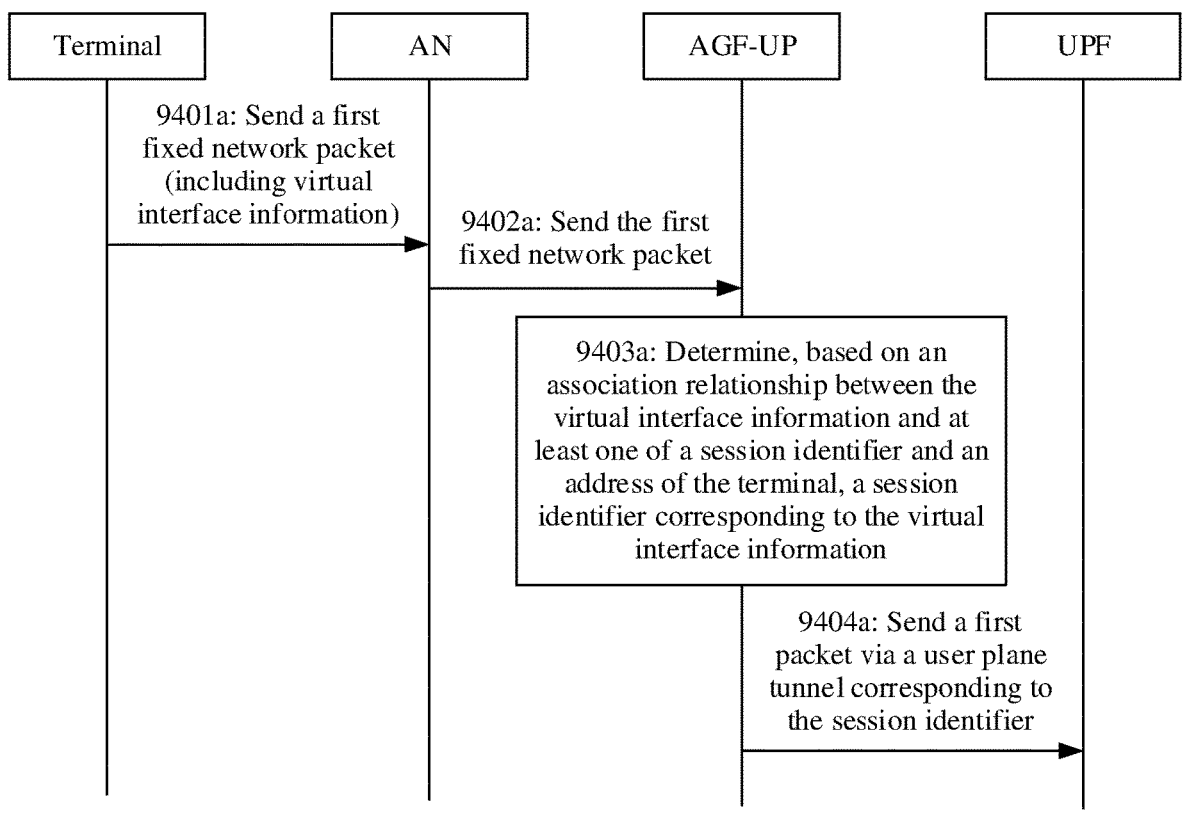
FIG. 9A and FIG. 9B are schematic flowcharts of a third session establishment method according to this disclosure.

Based on the session established according to the foregoing method, the terminal may perform uplink and downlink data transmission. Refer to FIG. 9A for the uplink packet transmission process. The following steps may be specifically included.

Step 9401a: A terminal sends a first packet carried in a first fixed network session to an AN.

The terminal may be a 5G-RG or an FN-RG. The first packet includes virtual interface information. The first fixed network session is the first session established according to the steps described in FIG. 8.

It should be noted that different fixed network access manners may be used between the terminal and the AN. For the different fixed network access manners, there is an implementation of a virtual interface between the terminal and the AN, so that the AN can identify a service type of a packet based on virtual interface information in a received packet.

Step 9402a: After the AN receives the first packet that is from the terminal and that is carried in the first fixed network session, the AN sends the first packet to an AGF-UP.

Step 9403a: After the AGF-UP receives the first packet from the AN, the AGF-UP determines, based on an association relationship between the virtual interface information and at least one of a session identifier and an address of the terminal, a session identifier corresponding to the virtual interface information.

Step 9404a: The AGF-UP sends the first packet to a UPF via a user plane tunnel corresponding to the session identifier, where the user plane tunnel is a transmission channel between the AGF-UP and the UPF.

Figure 9B:
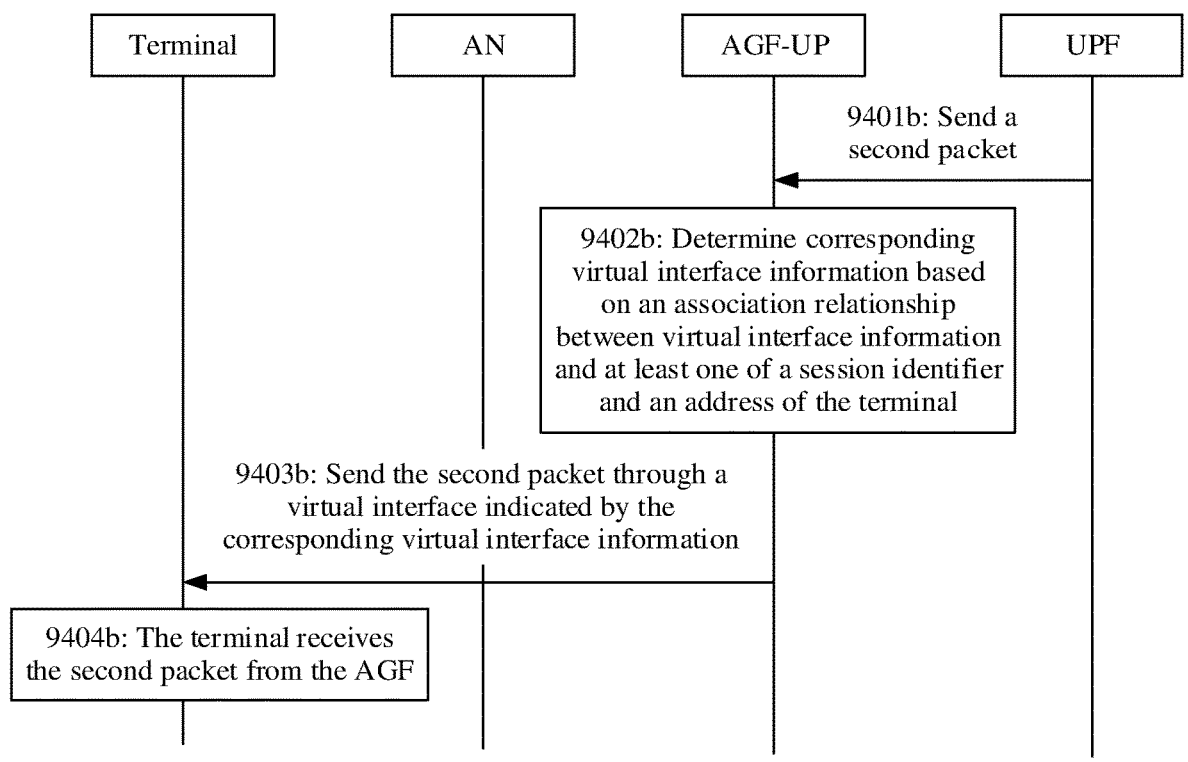

Refer to FIG. 9B for the downlink packet transmission process. The following steps may be specifically included.

Step 9401b: An AGF-UP receives, from a UPF network element, a second packet carried in a first fixed network session, where the second packet includes a user plane tunnel identifier of the user plane function network element.

The first fixed network session is the first session established according to the steps described in FIG. 8.

Step 9402b: After receiving the second packet, the AGF-UP determines corresponding virtual interface information based on a session identifier corresponding to the user plane tunnel identifier and an association relationship between virtual interface information and at least one of a session identifier and an address of a terminal.

Step 9403b: The AGF-UP sends the second packet to the terminal through a virtual interface indicated by the virtual interface information corresponding to the session identifier.

In other words, the AGF-UP encapsulates the second packet based on the virtual interface information corresponding to the session identifier, and sends the encapsulated second packet to the terminal.

Step 9404b: The terminal receives the second packet from the AGF.

In conclusion, the terminal and the AGF use the association relationship between the virtual interface information and the at least one of the session identifier and the address of the terminal, so that a connection between the terminal and the AGF one-to-one corresponds to a quality of service flow of a PDU session. This implements an end-to-end user plane connection between the terminal and the AGF, and ensures end-to-end quality of service.

Embodiment 6

Figure 10A:
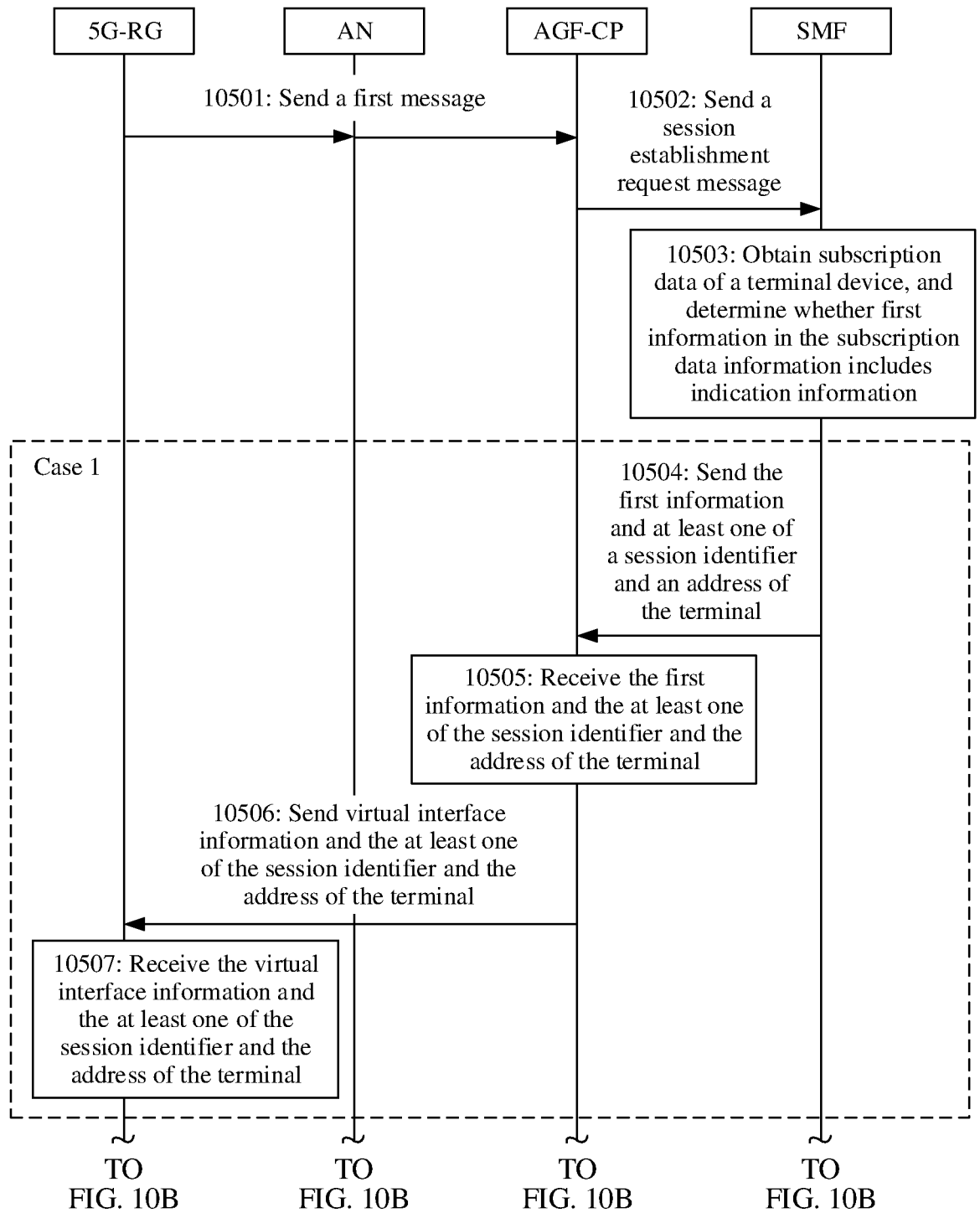
FIG. 10A and FIG. 10B are a schematic flowchart of another session establishment method according to this disclosure.
Figure 10B:
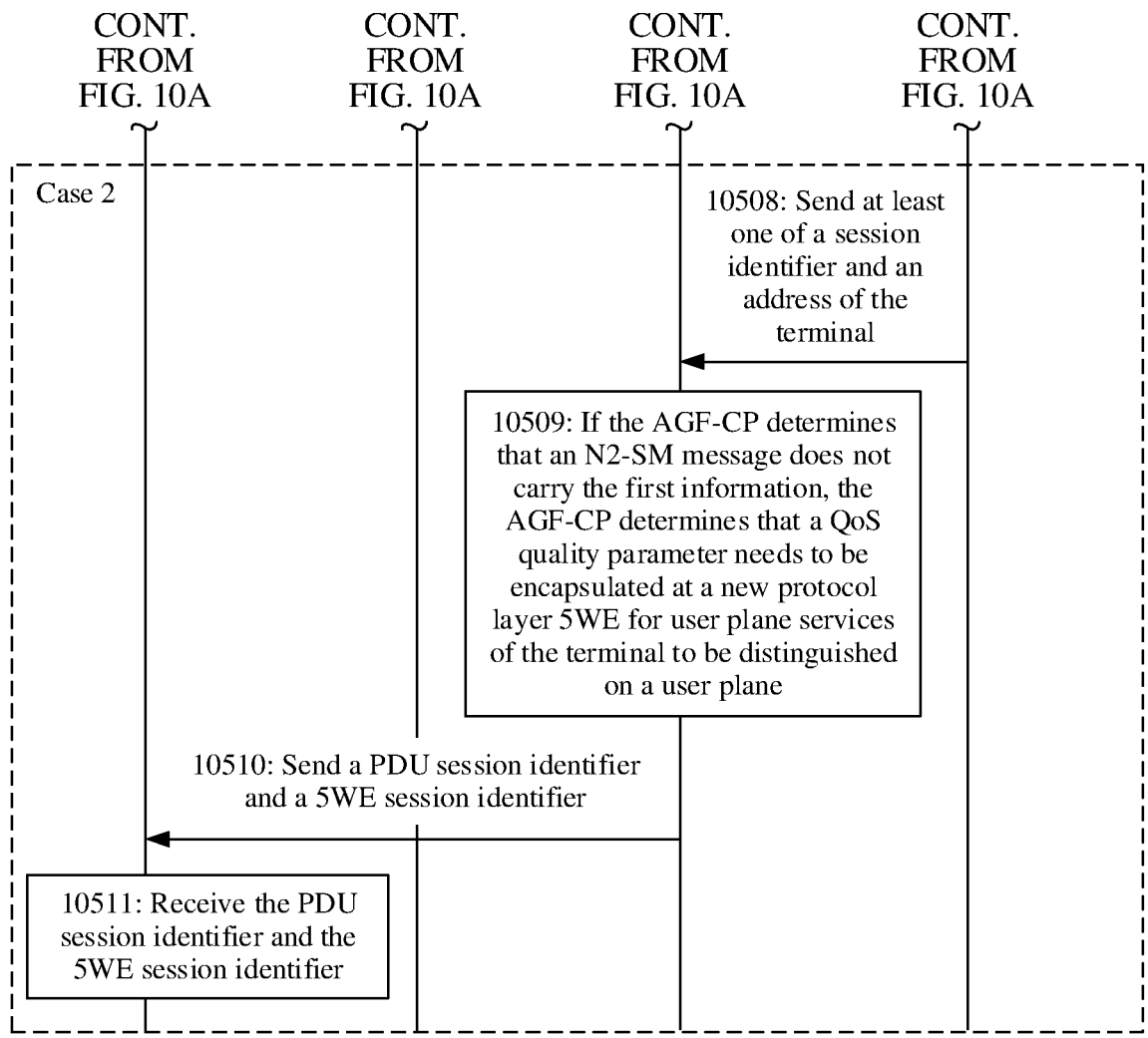

FIG. 10A and FIG. 10B are a schematic flowchart of another session establishment method according to this disclosure. Specifically, the method may include the following steps.

Step 10501: A terminal sends a first message to an AGF-CP, where the first message is for requesting to establish or modify a first session.

For example, the terminal may be a 5G-RG or an FN-RG. In a possible case, if the terminal is the 5G-RG, the first message is a NAS message, and the NAS message may be a PDU session establishment request message or a PDU session modification request message. In other words, the 5G-RG notifies, via the NAS message, an SMF to establish a PDU session. In this step, the 5G-RG may first send the NAS message to an AN, where the NAS message is for requesting to establish or modify the PDU session, and then the AN forwards the NAS message to the AGF-CP. The AN does not parse specific content in the NAS message, but directly forwards the received NAS message to the AGF-CP instead.

In another possible case, if the terminal is the FN-RG, the first message may be a DHCP discovery, a DHCP request message, a PPPoE PADI, or an IPCP/IPv6CP configuration request message, or any message in a DHCP procedure or a PPPoE procedure, that is, the FN-RG initiates the DHCP procedure or the PPPoE procedure to the AGF-CP, to establish a connection between the FN-RG and the AGF-CP.

Step 10502: The AGF-CP sends a session establishment request message to the SMF, where the session establishment request message is for requesting to establish or modify the first session.

For example, the terminal may be the 5G-RG or the FN-RG. When the terminal is the 5G-RG, the session establishment request may be a NAS message, and the NAS message may be a PDU session establishment request message or a PDU session modification request message. In other words, the 5G-RG notifies, via the NAS message, the SMF to establish the PDU session. After the AGF-CP receives the NAS message from the 5G-RG, the AGF-CP forwards the NAS message to an AMF. After receiving the session establishment message from the AGF-CP, the AMF notifies the SMF to complete an operation related to session establishment on a core network control plane. In this process, the AGF-CP does not parse specific content in the NAS message, but directly forwards the received NAS message instead.

When the terminal is the FN-RG, the AGF-CP generates a NAS message based on the first message (for example, any one of the DHCP discovery, the DHCP request message, the PPPoE PADI, or the IPCP/IPv6CP configuration request message, or any message in the DHCP procedure or the PPPoE procedure) sent by the FN-RG, and then forwards the NAS message to an AMF. The NAS message may be a PDU session establishment request message or a PDU session modification request. After receiving the session establishment message from the AGF-CP, the AMF notifies the SMF to complete an operation related to session establishment on a core network control plane.

Step 10503: The SMF obtains subscription data of the terminal, and determines whether the subscription data includes indication information.

If the subscription data includes the indication information, step 10504 to step 10507 corresponding to the following case 1 are performed. If the subscription data does not include the indication information, step 10508 to step 10511 corresponding to the following case 2 are performed. The indication information may be access location information or an access technology indication. For example, the access location information is a line identifier (line ID). The access technology indication is a wired access technology indication.

The subscription data may be at least one of DNN information and network slice information (for example, S-NSSAI). For example, the SMF may obtain the subscription data of the terminal from a UDM. It is preconfigured on the UDM that some DNNs have indication information, but some DNNs do not have indication information. If the indication information is configured in the DNN, the indication information indicates the SMF to include the DNN in N2 SM information when generating the N2 session management (SM) information. If the indication information is not configured in the DNN, the SMF does not need to include the DNN in N2 SM information. For another example, it is preconfigured on the UDM that some S-NSSAI has indication information, but some S-NSSAI does not have indication information. If the indication information is configured in the S-NSSAI, the indication information indicates the SMF to include the S-NSSAI in N2 SM information when generating the N2 SM information. If the indication information is not configured in the S-NSSAI, the SMF does not need to include the S-NSSAI in N2 SM information.

It should be noted that, in another possible case, if a message obtained by the SMF from a PCF includes indication information, the SMF needs to include a DNN/S-NSSAI in N2 SM information; or if a message obtained by the SMF from a PCF does not include indication information, the SMF does not need to include a DNN/S-NSSAI in N2 SM information.

Case 1

Step 10504: The SMF completes the operation related to the session establishment on the core network control plane, and then sends first information and at least one of a session identifier of the established first session and an address of the terminal to the AGF-CP.

Both the session identifier and the address of the terminal correspond to the established first session. The session identifier of the established first session may be a PDU session identifier (PDU session ID). The address of the terminal is an address allocated to the terminal. For example, the address of the terminal may be an IP address of the terminal that corresponds to the first session and that is allocated by a network side to the terminal. In a possible embodiment, the SMF sends an N2 message to the AGF-CP. The N2 message includes the address of the terminal, the session identifier, and the first information. The N2 message may further include tunnel information of a UPF corresponding to the established session, for example, include a general packet radio service (GPRS) tunneling protocol—user plane (GTP-U) and/or a tunnel endpoint identifier (TEID). In addition, the N2 message may further include session parameter information such as a QFI, a quality of service flow profile (QoS profile), CN tunnel information, and a PDU session type.

Step 10505: The AGF-CP receives the first information and the at least one of the session identifier and the address of the terminal from the SMF network element.

In a possible embodiment, the AGF-CP may further establish an association relationship between virtual interface information and the at least one of the session identifier and the address of the terminal.

Specifically, an association relationship between the first information and virtual interface information is preconfigured on the AGF-CP. Therefore, after obtaining the first information from the N2 message, the AGF-CP may determine the virtual interface information based on the association relationship between the first information and the virtual interface information, to establish the association relationship between the virtual interface information and the at least one of the session identifier and the address of the terminal.

For example, if the AGF-CP obtains a PDU session identifier and a DNN from N2 information, the AGF-CP determines that a user plane service of the terminal needs to be distinguished based on the virtual interface information as a service identifier. Therefore, the AGF-CP establishes an association relationship between the PDU session identifier and a VLAN ID based on the PDU session identifier, the DNN, and a preconfigured association relationship between the DNN and the VLAN ID. The AGF-CP may further generate a user plane AS parameter, where the user plane AS parameter includes the PDU session identifier and the VLAN ID corresponding to the PDU session identifier.

Step 10506: The AGF-CP sends, to the terminal, the virtual interface information corresponding to the session identifier and the at least one of the session identifier and the address of the terminal.

Specifically, the AGF-CP may send an AS parameter to the terminal, where the AS parameter carries the virtual interface information corresponding to the session identifier and the at least one of the session identifier and the address of the terminal, to notify the terminal to establish the association relationship between the virtual interface information and the at least one of the session identifier and the address of the terminal.

Step 10507: The terminal receives the virtual interface information corresponding to the session identifier and the at least one of the session identifier and the address of the terminal from the AGF-CP.

In a possible embodiment, after receiving the virtual interface information corresponding to the session identifier and the at least one of the session identifier and the address of the terminal from the AGF-CP, the terminal locally stores the association relationship between the virtual interface information and the at least one of the session identifier and the address of the terminal.

In this embodiment, after the terminal and the AGF establish the association relationship between the virtual interface information and the at least one of the session identifier and the address of the terminal, uplink packet and downlink packet transmission may be completed according to the processes shown in FIG. 9A and FIG. 9B. For details, refer to the foregoing descriptions. Details are not described herein again.

In Case 1, the terminal and the AGF use the association relationship between the virtual interface information and the at least one of the session identifier and the address of the terminal, so that a connection between the terminal and the AGF one-to-one corresponds to a quality of service flow of a PDU session. This implements an end-to-end user plane connection between the terminal and the AGF, and ensures end-to-end quality of service. In addition, a fixed network distinguishes between user plane services based on virtual interface information, so that a fixed network service can smoothly evolve to a 5G system with better compatibility.

Case 2

Step 10508: The SMF completes the operation related to the session establishment on the core network control plane, and then sends at least one of a session identifier of the established first session and an address of the terminal to the AGF-CP.

Step 10509: If the AGF-CP determines that N2-SM information does not carry the first information, the AGF-CP determines that a QoS quality parameter (such as a PDU session ID, a QFI, and an RQI) needs to be encapsulated at a new protocol layer 5WE for user plane services of the terminal to be distinguished on a user plane. To be specific, the AGF generates a user plane AS parameter, where the user plane AS parameter includes the PDU session identifier and a 5WE session identifier corresponding to the PDU session identifier.

During specific implementation, a 5WE header is externally encapsulated for a user plane data packet sent by the 5G-RG, and the 5WE header may carry the PDU session ID, the QFI, the RQI, and the like. After the AGF receives the user plane data packet sent by the 5G-RG, the AGF may identify a corresponding PDU session based on the PDU session ID, the QFI, and the RQI in the 5WE header, and send the user plane data packet to a UPF network element via user plane tunnel information corresponding to the PDU session.

Step 10510: The AGF-CP sends, to the terminal, the PDU session identifier and the 5WE session identifier corresponding to the PDU session identifier.

Specifically, the AGF-CP may notify, via the user plane AS parameter, the terminal of the PDU session identifier and the 5WE session identifier corresponding to the PDU session identifier.

Step 10511: The terminal receives the PDU session identifier and the 5WE session identifier from the AGF-CP.

In a possible embodiment, the terminal may further store an association relationship between the PDU session identifier and the 5WE session identifier.

In conclusion, if a DNN/S-NSSAI has corresponding indication information, it indicates that the terminal needs to establish a PDU session to the DNN by using a VLAN ID for user plane differentiation. If a DNN/S-NSSAI does not have corresponding indication information, it indicates that the terminal needs to establish a PDU session to the DNN by using 5WE for user plane differentiation. A same terminal may perform user plane transmission in different manners based on a service scenario.

Embodiment 7

Figure 11A:
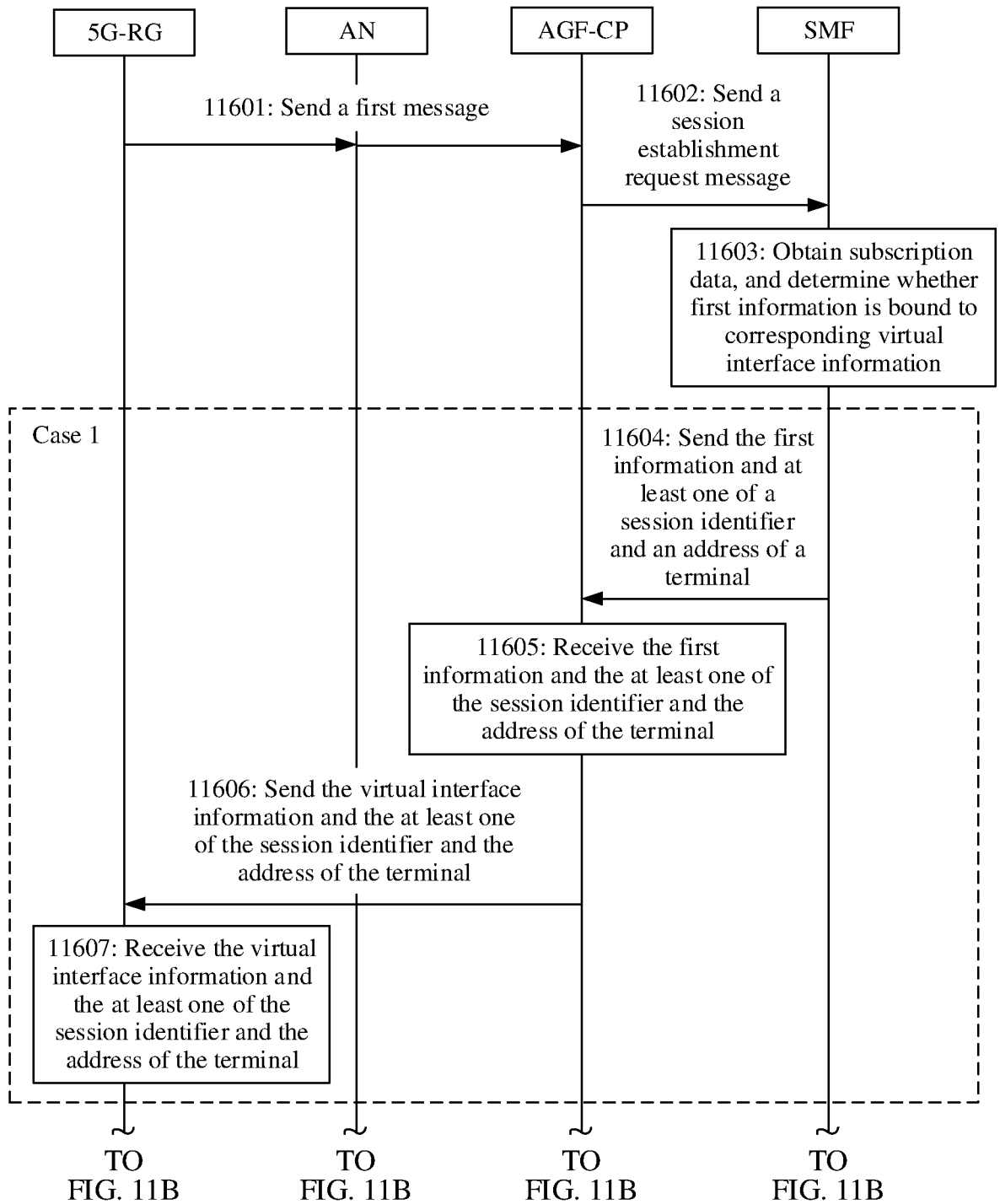
FIG. 11A and FIG. 11B are a schematic flowchart of another session establishment method according to this disclosure.
Figure 11B:
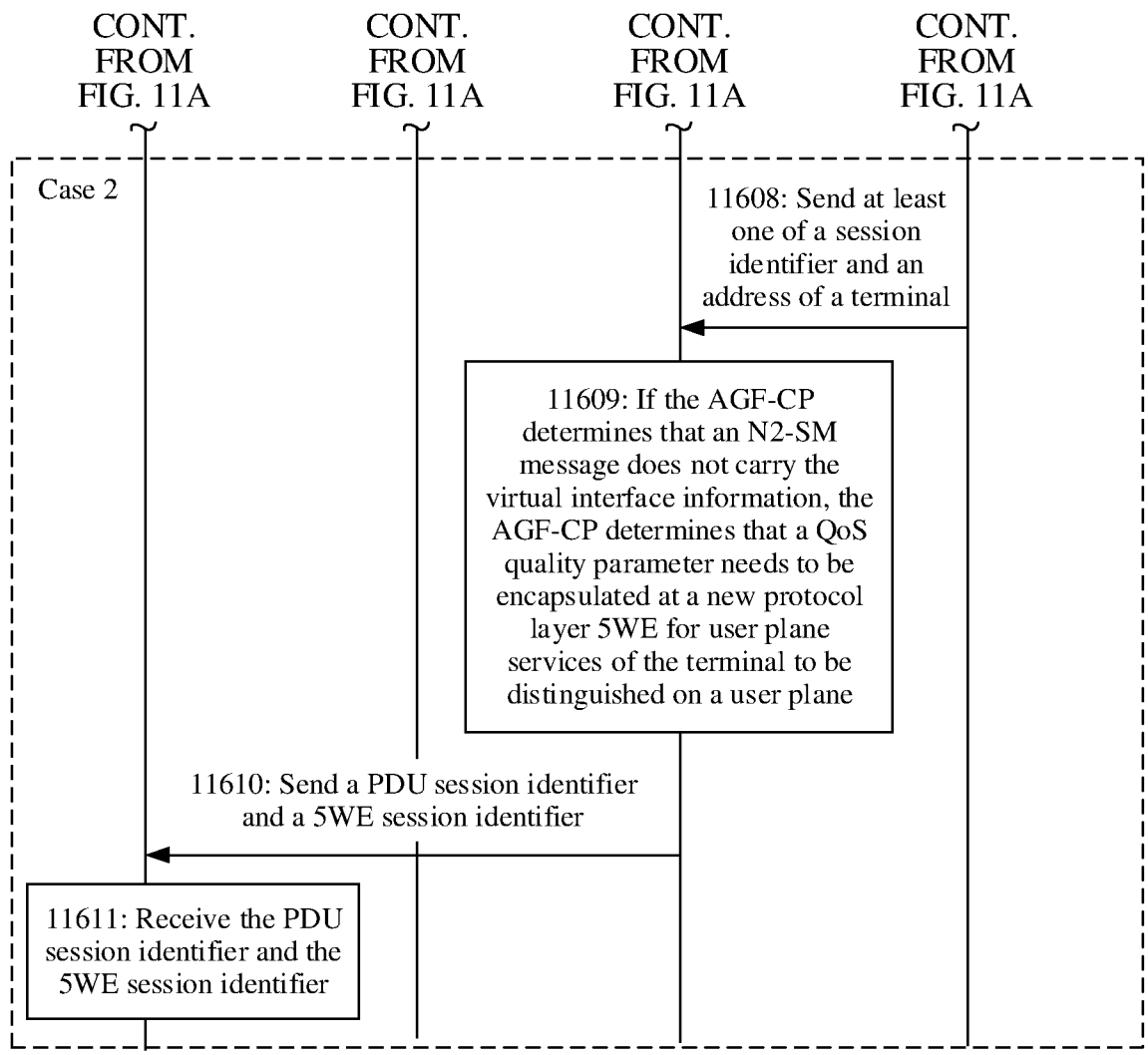

FIG. 11A and FIG. 11B are a schematic flowchart of another session establishment method according to this disclosure. Specifically, the method may include the following steps.

Step 11601: A terminal sends a first message to an AGF-CP, where the first message is for requesting to establish or modify a first session.

For details, refer to step 10501.

Step 11602: The AGF-CP sends a session establishment request message to an SMF, where the session establishment request message is for requesting to establish or modify the first session.

For details, refer to step 10502.

Step 11603: The SMF obtains subscription data, and determines whether first information is bound to corresponding virtual interface information. If the first information is bound to the corresponding virtual interface information, step 11603 to step 11606 corresponding to the following case 1 are performed. If the first information is not bound to the corresponding virtual interface information, step 11607 to step 11610 corresponding to the following case 2 are performed.

Specifically, the SMF obtains the subscription data of the terminal from a UDM, and determines whether the first information in the subscription data is bound to the corresponding virtual interface information. Alternatively, the SMF determines, from a local configuration policy, whether the first information is bound to the corresponding virtual interface information. Alternatively, the SMF determines, from policy information received from a PCF, whether the first information is bound to the corresponding virtual interface information. The first information may be DNN information or network slice information (for example, S-NSSAI). For example, it is preconfigured on the UDM that some DNNs are bound to corresponding virtual interface information, but some DNNs are not bound to virtual interface information. If the DNN is bound to the corresponding virtual interface information, the SMF may include the virtual interface information in N2 SM information when generating the N2 SM information. If the DNN is not bound to the virtual interface information, the SMF does not include the virtual interface information in N2 SM information. For another example, it is preconfigured on the UDM that some S-NSSAI is bound to corresponding virtual interface information, but some S-NSSAI is not bound to virtual interface information. If the S-NSSAI is bound to the corresponding virtual interface information, the SMF may include the virtual interface information in N2 SM information when generating the N2 SM information. If the S-NS- SAI is not bound to the virtual interface information, the SMF does not include the virtual interface information in N2 SM information.

Case 1

Step 11604: The SMF completes an operation related to session establishment on a core network control plane, and then sends the virtual interface information and at least one of a session identifier of the established first session and an address of the terminal to the AGF-CP.

Both the session identifier and the address of the terminal correspond to the established first session. The session identifier of the established first session may be a PDU session identifier (PDU session ID). The address of the terminal is an address allocated to the terminal. For example, the address of the terminal may be an IP address of the terminal that corresponds to the first session and that is allocated by a network side to the terminal. For details, refer to step 10504.

Step 11605: The AGF-CP receives the virtual interface information and the at least one of the session identifier of the established session and the address of the terminal from the SMF network element.

In a possible embodiment, the AGF-CP may further establish an association relationship between the virtual interface information and the at least one of the session identifier and the address of the terminal.

Step 11606: The AGF-CP sends, to the terminal, the virtual interface information and the at least one of the session identifier and the address of the terminal.

Specifically, the AGF-CP may send an AS parameter to the terminal, where the AS parameter carries the virtual interface information and the at least one of the session identifier and the address of the terminal, to notify the terminal of the association relationship between the virtual interface information and the at least one of the session identifier and the address of the terminal.

Step 11607: The terminal receives the session identifier and the virtual interface information corresponding to the session identifier from the AGF-CP.

In a possible embodiment, the terminal may further locally store the association relationship between the virtual interface information and the at least one of the session identifier and the address of the terminal.

In this embodiment, after the terminal and the AGF establish the association relationship between the virtual interface information and the at least one of the session identifier and the address of the terminal, uplink packet and downlink packet transmission may be completed according to the processes shown in FIG. 9A and FIG. 9B. For details, refer to the foregoing descriptions. Details are not described herein again.

In Case 1, the terminal and the AGF use the association relationship between the virtual interface information and the at least one of the session identifier and the address of the terminal, so that a connection between the terminal and the AGF one-to-one corresponds to a quality of service flow of a PDU session. This implements an end-to-end user plane connection between the terminal and the AGF, and ensures end-to-end quality of service. In addition, a fixed network distinguishes between user plane services based on virtual interface information, so that a fixed network service can smoothly evolve to a 5G system with better compatibility.

Case 2

Step 11608: The SMF completes an operation related to session establishment on a core network control plane, and then sends at least one of a session identifier of the established session and an address of the terminal to the AGF-CP.

Step 11609: If the AGF-CP determines that N2-SM information does not carry the virtual interface information, the AGF-CP determines that a QoS quality parameter (such as a PDU session ID, a QFI, and an RQI) needs to be encapsulated at a new protocol layer 5WE for user plane services of the terminal to be distinguished on a user plane. To be specific, the AGF generates a user plane AS parameter, where the user plane AS parameter includes the PDU session identifier and a 5WE session identifier corresponding to the PDU session identifier.

During specific implementation, a 5WE header is externally encapsulated for a user plane data packet sent by a 5G-RG, and the 5WE header may carry the PDU session ID, the QFI, the RQI, and the like. After the AGF receives the user plane data packet sent by the 5G-RG, the AGF may identify a corresponding PDU session based on the PDU session ID, the QFI, and the RQI in the 5WE header, and send the user plane data packet to a UPF network element via user plane tunnel information corresponding to the PDU session.

Step 11610: The AGF-CP sends, to the terminal, the PDU session identifier and the 5WE session identifier corresponding to the PDU session identifier.

Specifically, the AGF-CP may notify, via the user plane AS parameter, the terminal of the PDU session identifier and the 5WE session identifier corresponding to the PDU session identifier.

Step 11611: The terminal receives the PDU session identifier and the 5WE session identifier from the AGF-CP.

In a possible embodiment, the terminal may further store an association relationship between the PDU session identifier and the 5WE session identifier.

In conclusion, if a DNN/S-NSSAI has a corresponding VLAN ID, it indicates that the terminal needs to establish a PDU session to the DNN by using a VLAN ID for user plane differentiation. If a DNN/S-NSSAI does not have a corresponding VLAN ID, it indicates that the terminal needs to establish a PDU session to the DNN by using 5WE for user plane differentiation. A same terminal may perform user plane transmission in different manners based on a service scenario.

Embodiment 8

Figure 12:
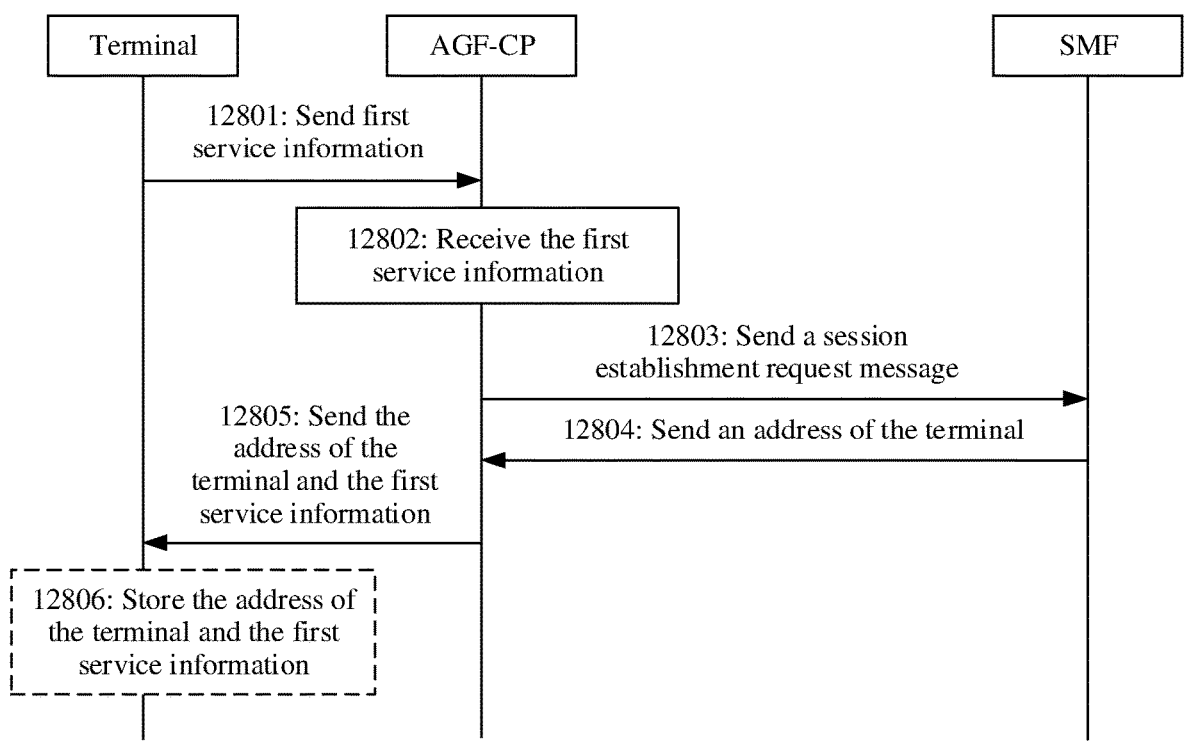
FIG. 12 is a schematic flowchart of another session establishment method according to this disclosure.

FIG. 12 is a schematic flowchart of another session establishment method according to this disclosure. Specifically, the method may include the following steps.

Step 12801: A terminal sends first service information to an AGF-CP.

The first service information includes domain name information and/or virtual interface information.

In a possible implementation, the terminal further sends an identifier of the terminal to the AGF-CP. The identifier of the terminal includes an IP address, a MAC address, or a user identifier in a network access identifier NAI.

Step 12802: The AGF-CP receives the first service information from the terminal.

Step 12803: The AGF-CP sends a session establishment request message to an SMF, where the session establishment request message includes second service information corresponding to the first service information, and the session establishment request message is for requesting to establish or modify a first session of the terminal.

The second service information includes a data network name DNN and/or network slice information.

Optionally, in step 12803, the AGF-CP further determines the second service information corresponding to the first service information. In a possible implementation, the AGF-CP sends a request message to a first network element (for example, a BBF-AAA), where the request message includes the first service information. The AGF-CP receives a response message from the first network element, where the response message includes the second service information. For details, refer to method steps shown in FIG. 13. In another possible implementation, the AGF-CP sends a first message #1 to an AMF, where the first message #1 includes the first service information. The AGF-CP receives a second message from the AMF, where the second message includes the second service information. For details, refer to method steps shown in FIG. 14.

Step 12804: The SMF sends an address of the terminal to the AGF-CP, where the address of the terminal corresponds to the first session.

Step 12805: The AGF-CP sends the first service information and the address of the terminal to the terminal.

In other words, the AGF-CP sends the first service information and the address of the terminal corresponding to the first service information to the terminal.

In a possible implementation, if the AGF-CP receives the identifier of the terminal in step 12801, the AGF-CP may further send the identifier of the terminal to the terminal in step 12805. In other words, the AGF-CP sends the first service information, the identifier of the terminal, and the corresponding address of the terminal to the terminal. Optionally, the AGF-CP stores a correspondence between the identifier of the terminal, the first service information, and the address of the terminal.

In a possible implementation, the AGF-CP stores a correspondence between the first service information and the second service information.

In a possible implementation, the AGF-CP receives an identifier of the first session from the session management function network element. The AGF-CP stores a correspondence between the identifier of the terminal, the first service information, and the identifier of the first session.

Optionally, the method further includes step 12806: The terminal stores a correspondence between the first service information and the address of the terminal.

In this way, the terminal may establish the correspondence between the first service information and the address of the terminal. The AGF and the terminal may use the association relationship, so that a connection between the terminal and the AGF one-to-one corresponds to a quality of service flow of a PDU session, implementing an end-to-end user plane connection between the terminal and the AGF.

Figure 13:
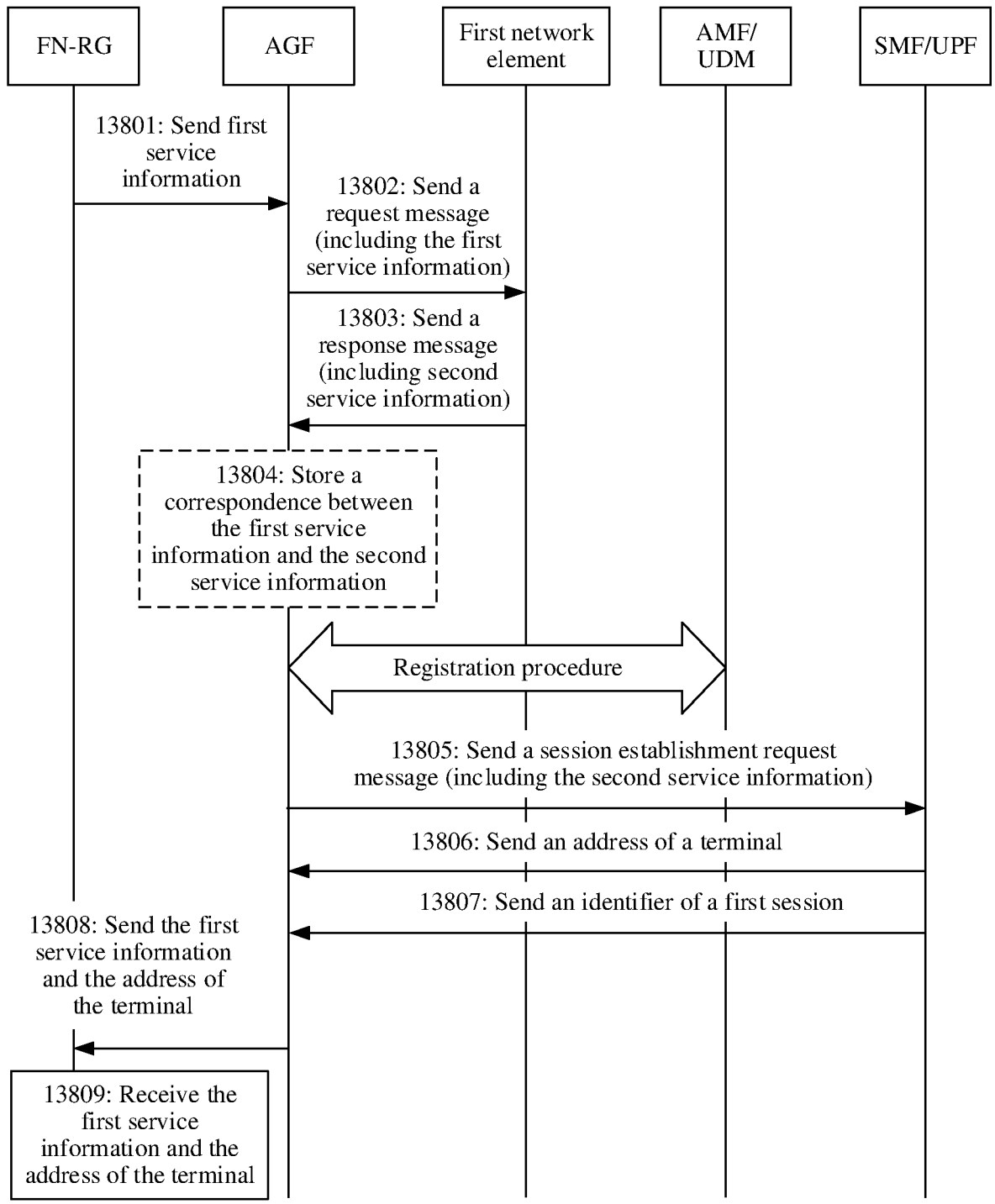
FIG. 13 is a schematic flowchart of another session establishment method according to this disclosure.
Figure 14:
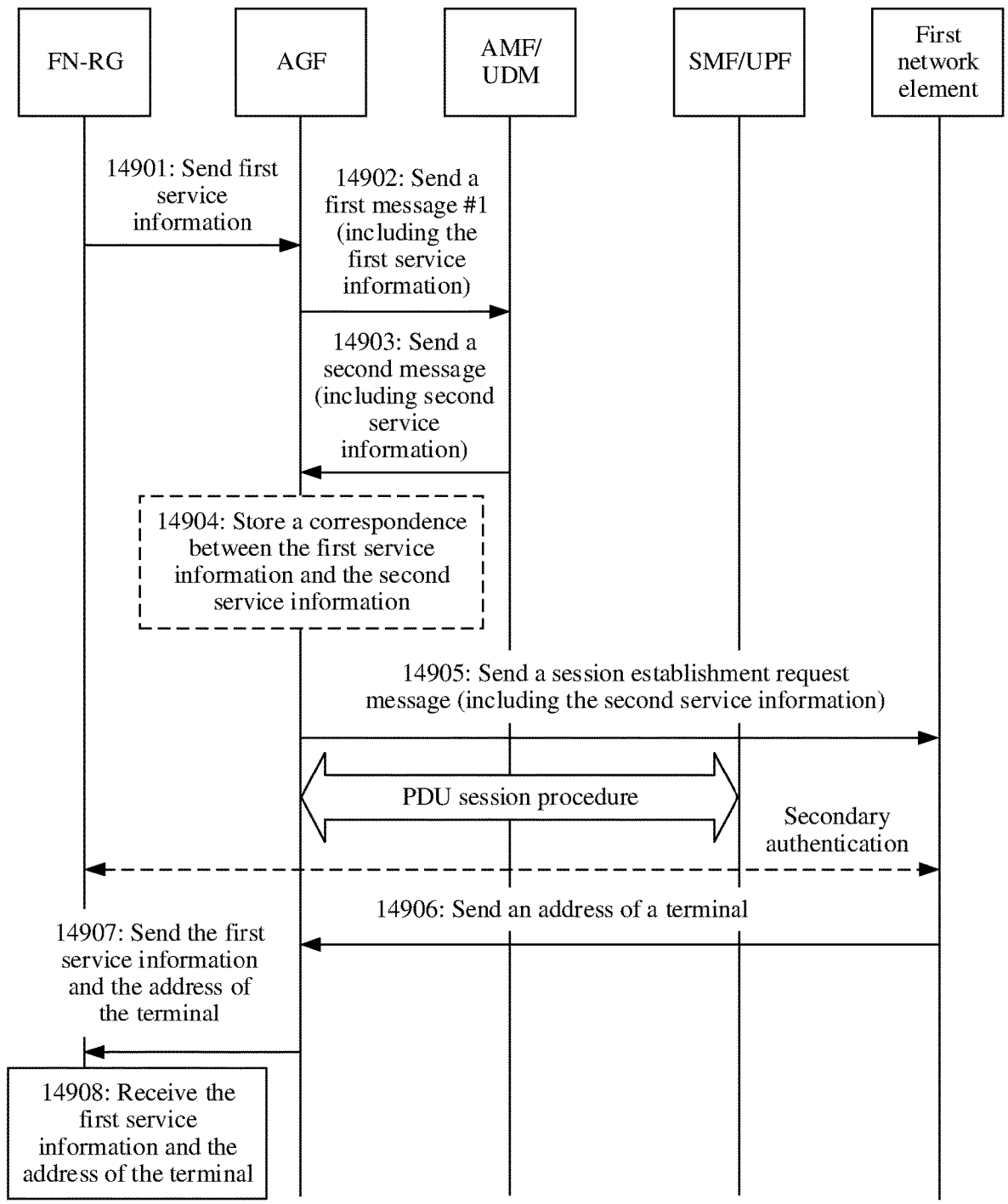
FIG. 14 is a schematic flowchart of another session establishment method according to this disclosure.

For more systematic descriptions, the following describes Embodiment 8 in detail with reference to a method shown in FIG. 13 and a method shown in FIG. 14.

FIG. 13 is a schematic flowchart of another session establishment method according to this disclosure. Specifically, the method may include the following steps.

Step 13801: A terminal sends a first message to an AGF-CP, where the first message includes first service information.

Optionally, the first service information includes at least one of domain name information and virtual interface information. The domain name information may be domain name information in a network access identifier (NAI), where the NAI includes at least one of a user identifier or the domain name information.

In this step, the terminal may be an FN-RG. The first message may be a point-to-point protocol over ethernet (PPPoE) message (namely, a PPPoE active discovery initiation (PADI) message, or a PPPoE active discovery request (PADR) message, applicable to an IPv4 or IPv6 address request), a DHCP message (namely, a discovery message or a request message, applicable to an IPv4 or IPv6 address request), an RS message (applicable to an IPv6 address request) message, or any message in a DHCP procedure or a PPPoE procedure. That is, the FN-RG initiates the DHCP procedure or the PPPoE procedure to the AGF-CP, to establish a connection between the FN-RG and the AGF-CP.

Optionally, the FN-RG may further send an identifier of the terminal to the AGF-CP. The identifier of the terminal includes at least one of an IP address, a MAC address, or a user identifier in a network access identifier NAI.

For example, the first message is carried in an L2 packet header, and the L2 packet header may include the virtual interface information and/or the NAI information. For another example, the NAI information and/or the virtual interface information may be carried in the first message. The NAI includes the user identifier and the domain name information. For example, the NAI information may be indicated in the following format: user ID@domain name, for example, David@CMCC.com. For specific content of the virtual interface information, refer to the foregoing embodiments.

It should be understood that the FN-RG obtains a correspondence between a service type (or a service identifier) and the virtual interface information (based on preconfigured policy information or policy information sent by an ACS or a PCF), or obtains a correspondence between a service type (or a service identifier) and the NAI information (based on preconfigured policy information or policy information sent by an ACS or a PCF). For example, the service type is, for example, a web television service, a video service, a voice service, or a data service, and the service identifier is, for example, a service ID. The foregoing correspondence may be configured by the ACS or the PCF for the FN-RG, or may be based on a local policy of the FN-RG. In this way, the FN-RG may first determine virtual interface information corresponding to a to-be-transmitted fixed network service, or determine NAI information corresponding to a to-be-transmitted fixed network service, to send the virtual interface information or the NAI information to the AGF-CP.

In a possible embodiment, the AGF may receive a plurality of first messages sent by the FN-RG. Different first messages carry different NAI information or different virtual interface information, and the different first messages are for requesting to establish or modify different sessions.

Step 13802: The AGF-CP sends a request message to a first network element, where the request message is for requesting second service information.

The second service information includes DNN information and/or network slice information. Optionally, the request message includes the first service information.

For example, the first network element is a broadband forum-authentication/authorization/accounting (broadband forum-authentication/authorization/accounting, BBF-AAA). The AGF-CP sends the request message to the BBF-AAA, where the request message includes domain name information.

Step 13803: The first network element sends a response message to the AGF-CP, where the response message includes the second service information.

The second service information corresponds to the first service information. The second service information is for determining virtual interface information or domain name information for user plane data transmission between the terminal and the access gateway function network element.

In a possible embodiment, the first network element further performs authentication on the FN-RG based on the NAI information. When the authentication succeeds, the first network element sends the second service information to the AGF-CP.

Optionally, the method further includes step 12804: The AGF-CP stores a correspondence between the first service information and the second service information.

Step 13805: The AGF sends a session establishment request message to the SMF, where the session establishment request message is for requesting to establish or modify the first session. The session establishment request message includes the second service information corresponding to the first service information.

It should be understood that, optionally, before the AGF, as an agent of the FN-RG, requests to establish or modify the first session to the SMF, the AGF, as the agent of the FN-RG, further initiates a registration procedure to a SGC. For a successfully registered FN-RG, the AGF-CP requests, based on the correspondence stored in step 12804, the SMF to establish or modify the first session.

Step 13806: The SMF sends an address of the terminal to the AGF-CP, where the address of the terminal corresponds to the first session.

Specifically, after receiving the session establishment request message from the AGF-CP, the SMF completes an operation related to session establishment on a core network control plane, and then the SMF sends the address of the terminal of the first session to the AGF-CP via an AMF. The address of the terminal is an address allocated to the terminal. The address of the terminal may be an IP address of the terminal that is of the first session and that is allocated by a network side to the terminal. For example, the SMF allocates the address of the terminal to the first session; or a UPF allocates the address of the terminal to the first session, and then the UPF sends the address to the AGF-CP via the SMF.

Optionally, the method further includes step 13807: The AGF-CP receives an identifier of the first session from the SMF.

In this step, the identifier of the first session may be a PDU session identifier (PDU session ID). In a possible embodiment, the AGF-CP further stores a correspondence between the identifier of the terminal, the first service information, and the identifier of the first session.

Step 13808: After receiving the address of the terminal, the AGF-CP sends the first service information and the address of the terminal to the terminal.

In other words, the AGF-CP sends a correspondence between the first service information and the address of the terminal to the terminal.

For example, the AGF-CP may send the address of the terminal to the FN-RG via an IP configuration message, a DHCP message (for example, a DHCP ACK message), or an RA message.

In a possible embodiment, when the AGF-CP receives the plurality of first messages sent by the FN-RG, different first messages carry different domain name information or different virtual interface information, and correspond to different sessions. Therefore, when sending the address of the terminal to the FN-RG, the AGF-CP further needs to send at least one of the domain name information and the virtual interface information to the FN-RG. In other words, the AGF determines the domain name information and/or the virtual interface information based on the session identifier of the first session and the stored correspondence between the session identifier and at least one of the domain name information and the virtual interface information. Therefore, when the address of the terminal and the at least one of the domain name information and the virtual interface information are sent to the FN-RG, the FN-RG determines a session corresponding to the address of the terminal.

Step 13809: The terminal receives the address of the terminal from the AGF-CP, where the address of the terminal corresponds to the first service information.

In a possible embodiment, after receiving the address of the terminal from the AGF-CP, the terminal stores the correspondence between the first service information and the address of the terminal.

In a possible embodiment, the terminal further receives the identifier of the terminal from the AGF-CP, and the identifier of the terminal corresponds to the first service information.

In this way, the FN-RG may further establish the correspondence between the first service information and the address of the terminal. The AGF and the FN-RG may use the association relationship, so that a connection between the FN-RG and the AGF one-to-one corresponds to a quality of service flow of a PDU session, implementing an end-to-end user plane connection between the FN-RG and the AGF.

FIG. 14 is a schematic flowchart of another session establishment method according to this disclosure. Specifically, the method may include the following steps.

Step 14901 is the same as step 13801.

Step 14902: An AGF-CP sends a first message #1 of an FN-RG to an AMF, where the first message #1 carries first service information, and the first message #1 is for requesting to register the FN-RG with a core network or requesting to establish or update a session.

For example, the first message #1 may be a registration request message, or may be a session request message or a session update message.

Step 14903: The AMF or an SMF sends a second message to the AGF-CP.

Specifically, the AMF or the SMF obtains subscription data of a terminal from a UDM, where the subscription data includes second service information, or the subscription data includes a correspondence between the first service information and at least one of NAI information and virtual interface information. The AMF or the SMF sends the second message to the AGF-CP, where the second message includes the second service information, or includes a correspondence between the second service information and the first service information. The second message may be a registration response message, a response message, a reply message, or a request message. The second service information includes at least one of network slice information and DNN information, and the second service information corresponds to at least one information in the first service information. The second service information is for determining the first service information for user plane data transmission between the terminal and the access gateway function network element.

Optionally, a 5GC completes authentication and/or access authentication for the FN-RG. For a successfully authenticated FN-RG, the UDM sends the second service information (or sends the correspondence between the first service information and the second service information) to the AMF or the SMF, and then the AMF or the SMF sends the second service information (or sends the correspondence between the first service information and the second service information) to the AGF-CP.

Optionally, the FN-RG may obtain policy information from a policy control function network element, and the policy information includes the second service information corresponding to the first service information.

Optionally, the method further includes step 14904: The AGF-CP stores the correspondence between the first service information and the second service information.

Step 14905: The AGF sends a session establishment request message to the SMF, where the session establishment request message is for requesting to establish or modify a first session. The session establishment request message includes the second service information corresponding to the first service information.

For example, the AGF initiates a session establishment or modification procedure, where the session establishment request message carries corresponding DNN information and/or slice information.

In a possible embodiment, the FN-RG may further perform FN-RG authentication on a BBF-AAA server based on a secondary authentication procedure of a PDU session, for example, transfer user name/password information of the FN-RG to the BBF-AAA server via the PDU session. The BBF-AAA server authenticates the FN-RG based on the user name and password.

Step 14906: The SMF sends an address of the terminal to the AGF-CP, where the address of the terminal corresponds to the second service information.

The address of the terminal is an address allocated to the terminal. For example, the address of the terminal may be an IP address of the terminal that is of the first session and that is allocated by a network side to the terminal. The address of the terminal may be carried in a response message of a NAS message. For example, the response message of the NAS message may be a PDU session establishment accept message or a PDU session modification command message. The response message further includes a session identifier (for example, a PDU session ID).

Step 14907 is the same as step 13808.

Step 14908 is the same as step 13809.

A difference between the foregoing method and the method shown in FIG. 13 lies in that the correspondence between the first information and the virtual interface information or the domain name information is not sent by the first network element, but is sent by the 5GC to the AGF-CP.

It should be noted that the session establishment request message mentioned in the foregoing embodiments and subsequent embodiments is for requesting to establish a session. The session establishment request message is merely a name, and may be replaced by another name during actual application. For example, the session establishment request message may be replaced by the following names, including but not limited to: a message for requesting to establish a session, a first message, a request message, a session request message, a session establishment request message, a session modification request message, a session modification message, and the like.

Similarly, the session establishment complete message mentioned in the foregoing embodiments and subsequent embodiments indicates that establishment of a session is completed. The session establishment complete message is merely a name, and may be replaced by another name during actual application. For example, the session establishment complete message may be replaced by the following names, including but not limited to: a message indicating that establishment of a session is completed, a first message, a response message, a session complete indication message, a session complete message, a session modification complete message, a session modification response message, and the like.

For Embodiment 1 to Embodiment 8, it should be noted that: (1) The foregoing Embodiment 1 and Embodiment 8 may be separately implemented in different scenarios, or may be implemented in combination in a same scenario, or different solutions in different embodiments may be implemented in combination. This is not specifically limited.

(2) Step numbers in the flowcharts described in embodiments of this disclosure are merely an example of an execution procedure, and do not constitute any limitation on an execution sequence of the steps. In embodiments of this disclosure, there is no strict execution sequence between steps that do not have a time sequence dependency relationship with each other.

The foregoing mainly describes the solutions provided in embodiments of this disclosure from a perspective of interaction between a network device and a terminal. It may be understood that, to implement the foregoing functions, the network device or the terminal may include a corresponding hardware structure and/or a software module for performing each function. A person skilled in the art should be easily aware that, in embodiments of this disclosure, the units and algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

In embodiments of this disclosure, division into functional units may be performed on the terminal and the network device based on the foregoing method examples. For example, division into each functional unit may be based on each corresponding function, or two or more functions may be integrated into one unit. The integrated unit may be implemented in a form of hardware, or may be implemented in a form of a software functional unit.

Figure 15:
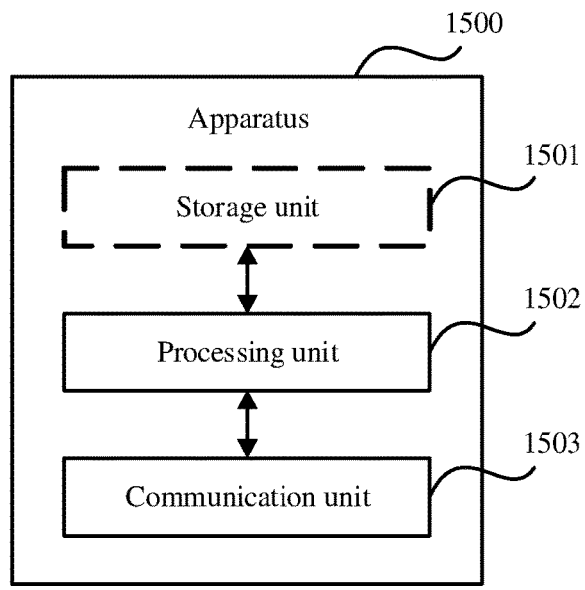
FIG. 15 is a block diagram of a possible example of an apparatus according to an embodiment of this disclosure.

When an integrated unit is used, FIG. 15 is a block diagram of a possible example of an apparatus according to an embodiment of this disclosure. As shown in FIG. 15, the apparatus 1500 may include a processing unit 1502 and a communication unit 1503. The processing unit 1502 is configured to control and manage an action of the apparatus 1500. The communication unit 1503 is configured to support the apparatus 1500 in communicating with another device. Optionally, the communication unit 1503 is also referred to as a transceiver unit, and may include a receiving unit and/or a sending unit, respectively configured to perform a receiving operation and a sending operation. The apparatus 1500 may further include a storage unit 1501, configured to store program code and/or data of the apparatus 1500.

The apparatus 1500 may be the terminal in any one of the foregoing embodiments, or may be a chip disposed in the terminal. The processing unit 1502 may support the apparatus 1500 in performing actions of the terminal in the foregoing method examples. Alternatively, the processing unit 1502 mainly performs an internal action of the terminal in the method examples, and the communication unit 1503 may support communication between the apparatus 1500 and a network device.

The apparatus 1500 may be the network device in any one of the foregoing embodiments, or may be a chip disposed in the network device. The processing unit 1502 may support the apparatus 1500 in performing actions of the network device in the foregoing method examples. Alternatively, the processing unit 1502 mainly performs an internal action of the network device in the method examples, and the communication unit 1503 may support communication between the apparatus 1500 and a network device. For example, the processing unit 1502 may be configured to perform an internal action of the network device in the method examples, and the communication unit 1503 may be configured to support communication between the apparatus 1500 and the terminal.

It should be understood that division into units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together or may be individually implemented. The processing element herein may also be referred to as a processor, and may be an integrated circuit having a signal processing capability. During implementation, the steps in the foregoing methods or the foregoing units may be implemented by using a hardware integrated logic circuit in a processing element, or may be implemented in the form in which the processing element invokes software.

In an example, a unit in any one of the foregoing apparatuses may be one or more integrated circuits configured to implement the foregoing method, for example, one or more application-specific integrated circuits (ASICs), one or more microprocessors (DSPs), one or more field programmable gate arrays (FPGAs), or a combination of at least two of these integrated circuit forms. For another example, when the units in the apparatus may be implemented in a form in which a processing element schedules a program, the processing element may be a processor, for example, a general-purpose central processing unit (CPU) or another processor that can invoke the program. For still another example, the units may be integrated and implemented in a form of a system-on-a-chip (SOC).

The foregoing unit configured for receiving is an interface circuit of the apparatus, and is configured to receive a signal from another apparatus. For example, when the apparatus is implemented in a manner of a chip, the receiving unit is an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal to another chip or apparatus.

Figure 16:
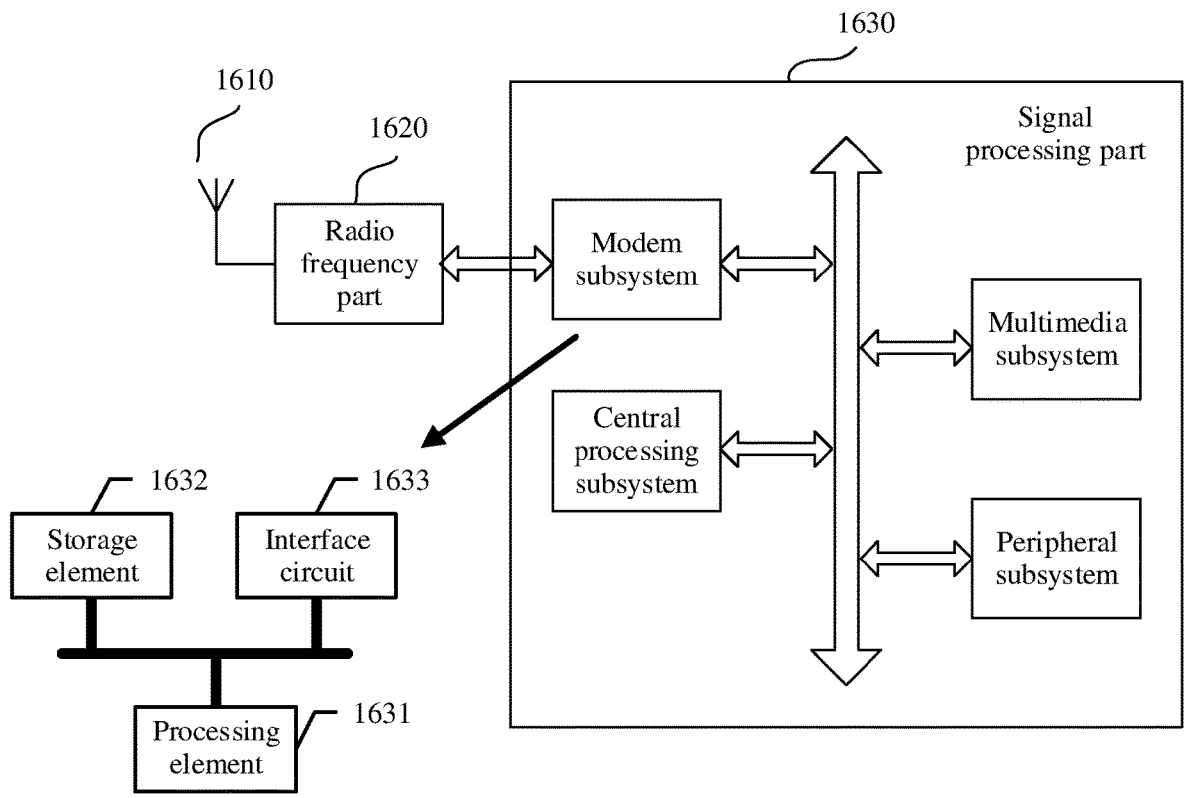
FIG. 16 is a schematic diagram of a structure of a terminal according to an embodiment of this disclosure.

FIG. 16 is a schematic diagram of a structure of a terminal according to an embodiment of this disclosure. The terminal may be the terminal in the foregoing embodiments, configured to implement operations of the terminal in the foregoing embodiments. As shown in FIG. 16, the terminal includes an antenna 1610, a radio frequency part 1620, and a signal processing part 1630. The antenna 1610 is connected to the radio frequency part 1620. In a downlink direction, the radio frequency part 1620 receives, through the antenna 1610, information sent by a network device, and sends, to the signal processing part 1630 for processing, the information sent by the network device. In an uplink direction, the signal processing part 1630 processes information of the terminal, and sends the information to the radio frequency part 1620. The radio frequency part 1620 processes the information of the terminal, and then sends processed information to the network device through the antenna 1610.

The signal processing part 1630 may include a modem subsystem, configured to implement data processing at each communication protocol layer, and may further include a central processing subsystem, configured to process an operating system and an application layer of the terminal.

The modem subsystem may include one or more processing elements 1631, for example, include one main control CPU and another integrated circuit. In addition, the modem subsystem may further include a storage element 1632 and an interface circuit 1633. The storage element 1632 is configured to store data and a program. However, a program used to perform the method performed by the terminal in the foregoing methods may not be stored in the storage element 1632, but is stored in a memory outside the modem subsystem, and is loaded and used by the modem subsystem when to be used. The interface circuit 1633 is configured to communicate with another subsystem.

The modem subsystem may be implemented by using a chip. The chip includes at least one processing element and an interface circuit. The processing element is configured to perform the steps of any method performed by the terminal. The interface circuit is configured to communicate with another apparatus. In an implementation, units in the terminal for implementing the steps in the foregoing methods may be implemented in a form of scheduling a program by a processing element. For example, the apparatus used in the terminal includes a processing element and a storage element. The processing element invokes a program stored in the storage element, to perform the method performed by the terminal in the foregoing method embodiments. The storage element may be a storage element located on a same chip as the processing element, namely, an on-chip storage element.

In another implementation, a program used to perform the method performed by the terminal in the foregoing methods may be in a storage element located on a different chip from the processing element, namely, an off-chip storage element. In this case, the processing element invokes or loads the program from the off-chip storage element to the on-chip storage element, to invoke and perform the method performed by the terminal in the foregoing method embodiments.

In still another implementation, units in the terminal for implementing the steps in the foregoing methods may be configured as one or more processing elements. These processing elements are disposed on the modem subsystem. The processing element herein may be an integrated circuit, for example, one or more ASICs, one or more DSPs, one or more FPGAs, or a combination of these types of integrated circuits. These integrated circuits may be integrated together to form a chip.

The units in the terminal for implementing the steps in the foregoing methods may be integrated together and implemented in a form of an SOC, and the SOC chip is configured to implement the foregoing methods. At least one processing element and a storage element may be integrated into the chip, and the processing element invokes a program stored in the storage element to implement the foregoing method performed by the terminal. Alternatively, at least one integrated circuit may be integrated into the chip, to implement the foregoing method performed by the terminal. Alternatively, with reference to the foregoing implementations, functions of some units may be implemented by invoking a program by the processing element, and functions of some units may be implemented by the integrated circuit.

It can be learned that the foregoing apparatus used in the terminal may include at least one processing element and an interface circuit. The at least one processing element is configured to perform any method performed by the terminal in the foregoing method embodiments. The processing element may perform some or all steps performed by the terminal in a first manner, that is, by invoking a program stored in the storage element; or may perform some or all steps performed by the terminal in a second manner, that is, by combining instructions and a hardware integrated logic circuit in the processing element. Certainly, some or all steps performed by the terminal may alternatively be performed by combining the first manner and the second manner.

The processing element herein is the same as that described above, and may be implemented through a processor. A function of the processing element may be the same as a function of the processing unit described in FIG. 15. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented through a memory. A function of the storage element may be the same as a function of the storage unit described in FIG. 15. The storage element may be implemented through a memory. A function of the storage element may be the same as a function of the storage unit described in FIG. 15. The storage element may be a memory, or may be an umbrella term for a plurality of memories.

The terminal shown in FIG. 16 can implement processes related to the 5G-RG or the FN-RG in the foregoing method embodiments. Operations and/or functions of modules in the terminal shown in FIG. 15 are respectively intended to implement corresponding procedures in the foregoing method embodiments. For details, refer to the descriptions in the foregoing method embodiments. To avoid repetition, detailed descriptions are properly omitted herein.

Figure 17:
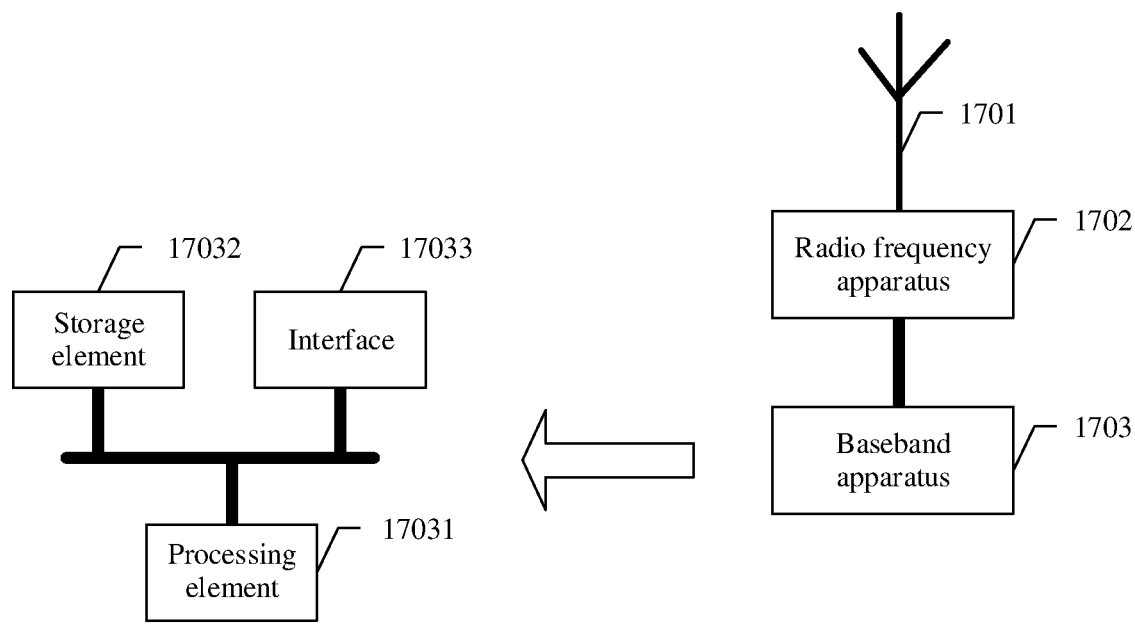
FIG. 17 is a schematic diagram of a structure of a network device according to an embodiment of this disclosure.

FIG. 17 is a schematic diagram of a structure of a network device according to an embodiment of this disclosure. The network device is configured to implement operations of the network device in the foregoing embodiments. As shown in FIG. 17, the network device includes an antenna 1701, a radio frequency apparatus 1702, and a baseband apparatus 1703. The antenna 1701 is connected to the radio frequency apparatus 1702. In an uplink direction, the radio frequency apparatus 1702 receives, through the antenna 1701, information sent by a terminal, and sends, to the baseband apparatus 1703 for processing, the information sent by the terminal. In a downlink direction, the baseband apparatus 1703 processes information of the terminal, and sends the information to the radio frequency apparatus 1702. The radio frequency apparatus 1702 processes the information of the terminal, and then sends processed information to the terminal through the antenna 1701.

The baseband apparatus 1703 may include one or more processing elements 17031, for example, include one main control CPU and another integrated circuit. In addition, the baseband apparatus 1703 may further include a storage element 17032 and an interface 17033. The storage element 17032 is configured to store a program and data. The interface 17033 is configured to exchange information with the radio frequency apparatus 1702, and the interface is, for example, a common public radio interface (CPRI). The foregoing apparatus used in the network device may be located in the baseband apparatus 1703. For example, the foregoing apparatus used in the network device may be a chip on the baseband apparatus 1703. The chip includes at least one processing element and an interface circuit. The processing element is configured to perform the steps of any one of the methods performed by the network device. The interface circuit is configured to communicate with another apparatus. In an implementation, units in the network device for implementing the steps in the foregoing methods may be implemented in a form of scheduling a program by a processing element. For example, the apparatus used in the network device includes a processing element and a storage element. The processing element invokes a program stored in the storage element, to perform the method performed by the network device in the foregoing method embodiments. The storage element may be a storage element located on a same chip as the processing element, namely, an on-chip storage element; or may be a storage element that is located on a different chip from the processing element, namely, an off-chip storage element.

In another implementation, units in the network device for implementing the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

The units in the network device for implementing the steps in the foregoing methods may be integrated together, and implemented in a form of a system-on-a-chip (SOC). For example, the baseband apparatus includes the SOC chip, and is configured to implement the foregoing methods. At least one processing element and a storage element may be integrated into the chip, and the processing element invokes a program stored in the storage element to implement the foregoing method performed by the network device. Alternatively, at least one integrated circuit may be integrated into the chip, to implement the foregoing method performed by the network device. Alternatively, with reference to the foregoing implementations, functions of some units may be implemented by invoking a program by the processing element, and functions of some units may be implemented by the integrated circuit.

It can be learned that the foregoing apparatus used in the network device may include at least one processing element and an interface circuit. The at least one processing element is configured to perform any method performed by the network device in the foregoing method embodiments. The processing element may perform some or all steps performed by the network device in a first manner, that is, by invoking a program stored in the storage element; or may perform some or all steps performed by the network device in a second manner, that is, by combining instructions and a hardware integrated logic circuit in the processing element. Certainly, some or all steps performed by the network device may alternatively be performed by combining the first manner and the second manner.

The processing element herein is the same as that described above, and may be implemented through a processor. A function of the processing element may be the same as a function of the processing unit described in FIG. 17. For example, the processing element may be a general-purpose processor, for example, a CPU, or may be one or more integrated circuits configured to implement the foregoing methods, for example, one or more ASICs, one or more microprocessors DSPs, or one or more FPGAs, or a combination of at least two of the integrated circuit forms. The storage element may be implemented through a memory. A function of the storage element may be the same as a function of the storage unit described in FIG. 15. The storage element may be implemented through a memory. A function of the storage element may be the same as a function of the storage unit described in FIG. 15. The storage element may be a memory, or may be an umbrella term for a plurality of memories.

The network device shown in FIG. 17 can implement processes related to the network device in the foregoing method embodiments. Operations and/or functions of modules in the network device shown in FIG. 17 are respectively intended to implement corresponding procedures in the foregoing method embodiments. For details, refer to the descriptions in the foregoing method embodiments. To avoid repetition, detailed descriptions are properly omitted herein.

A person skilled in the art should understand that embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or any other programmable data processing device, so that a series of operations and steps are performed on the computer or the any other programmable device, so that computer-implemented processing is generated. Therefore, the instructions executed on the computer or the any other programmable device provide steps for implementing a specific function in one or more processes in the flowcharts and/or in one or more blocks in the block diagrams.

It is clear that a person skilled in the art can make various modifications and variations to this disclosure without departing from the spirit and scope of this disclosure. This disclosure is intended to cover these modifications and variations of this disclosure provided that they fall within the scope of protection defined by the following claims and their equivalent technologies.

What is claimed is:

1. A communication method comprising:
sending a session establishment request message to a session management function network element, wherein the session establishment request message is for requesting to establish or modify a session;
receiving at least one of a session identifier or an address of a terminal from the session management function network element, wherein both the session identifier and the address of the terminal correspond to the session;
obtaining virtual interface information corresponding to the at least one of the session identifier or the address of the terminal, wherein the virtual interface information is an identifier of a virtual interface between the terminal and an access gateway function network element; and
sending the virtual interface information and the at least one of the session identifier or the address of the terminal to the terminal;
wherein the obtaining of the virtual interface information corresponding to the at least one of the session identifier or the address of the terminal comprises:
receiving an access stratum message from the terminal, wherein the access stratum message comprises the virtual interface information; and
determining that the virtual interface information corresponds to the session identifier.

2. The method according to claim 1, further comprising:
receiving a packet from a user plane function network element, wherein the packet comprises a user plane tunnel identifier of the user plane function network element; and
determining, based on a session identifier corresponding to the user plane tunnel identifier, the virtual interface information corresponding to the session identifier, and sending the packet to the terminal through a virtual interface corresponding to the virtual interface information, wherein the virtual interface is the virtual interface between the terminal and the access gateway function network element.

3. The method according to claim 1, wherein identifier of the virtual interface is configured to distinguish between virtual channel information of a fixed network service.

4. The method according to claim 1, wherein the virtual interface information is virtual path identifier (VPI) or virtual channel identifier (VCI) information in a digital subscriber line (DSL).

5. The method according to claim 1, wherein the virtual interface information is a virtual local area network (VLAN) identifier accessible by an ethernet.

6. A communication method comprising:
sending a session establishment request message to a session management function network element, wherein the session establishment request message is for requesting to establish or modify a session;

receiving at least one of a session identifier or an address of a terminal from the session management function network element, wherein both the session identifier and the address of the terminal correspond to the session;

obtaining virtual interface information corresponding to the at least one of the session identifier or the address of the terminal, wherein the virtual interface information is an identifier of a virtual interface between the terminal and an access gateway function network element;

sending the virtual interface information and the at least one of the session identifier or the address of the terminal to the terminal;

receiving a packet from the terminal, wherein the packet comprises the virtual interface information; and sending the packet to a user plane function network element based on the session identifier corresponding to the virtual interface information via a user plane tunnel corresponding to the session identifier, wherein the user plane tunnel is a transmission channel between the access gateway function network element and the user plane function network element.

7. A communication apparatus comprising: a transceiver; at least one processor; and one or more memories coupled to the at least one processor and storing programming instructions which when executed by the at least one processor cause the communication apparatus to at least perform:

sending a session establishment request message to a session management function network element, wherein the session establishment request message is for requesting to establish or modify a session;

receiving at least one of a session identifier or an address of a terminal from the session management function network element, wherein both the session identifier and the address of the terminal correspond to the session;

obtaining virtual interface information corresponding to the at least one of the session identifier or the address of the terminal, wherein the virtual interface information is an identifier of a virtual interface between the terminal and an access gateway function network element;

sending the virtual interface information and the at least one of the session identifier or the address of the terminal to the terminal;

receiving an access stratum message from the terminal, wherein the access stratum message comprises the virtual interface information; and determining that the virtual interface information corresponds to the session identifier.

8. The communication apparatus according to claim 7, wherein the programming instructions, when executed by the at least one processor, cause the communication apparatus to further perform:

receiving a packet from a user plane function network element, wherein the packet comprises a user plane tunnel identifier of the user plane function network element; and determining, based on a session identifier corresponding to the user plane tunnel identifier, the virtual interface information corresponding to the session identifier, and sending the packet to the terminal through a virtual interface corresponding to the virtual interface information, wherein the virtual interface is the virtual interface between the terminal and the access gateway function network element.

9. The communication apparatus according to claim 7, wherein identifier of the virtual interface is configured to distinguish between virtual channel information of a fixed network service.

10. The communication apparatus according to claim 7, wherein the virtual interface information is virtual path identifier (VPI) or virtual channel identifier (VCI) information in a digital subscriber line (DSL).

11. The communication apparatus according to claim 7, wherein the virtual interface information is a virtual local area network (VLAN) identifier accessible by an ethernet.

12. A communication apparatus comprising: a transceiver; at least one processor; and one or more memories coupled to the at least one processor and storing programming instructions which when executed by the at least one processor cause the communication apparatus to at least perform:

sending a session establishment request message to a session management function network element, wherein the session establishment request message is for requesting to establish or modify a session;

receiving at least one of a session identifier or an address of a terminal from the session management function network element, wherein both the session identifier and the address of the terminal correspond to the session;

obtaining virtual interface information corresponding to the at least one of the session identifier or the address of the terminal, wherein the virtual interface information is an identifier of a virtual interface between the terminal and an access gateway function network element;

sending the virtual interface information and the at least one of the session identifier or the address of the terminal to the terminal;

receiving a packet from the terminal, wherein the packet comprises the virtual interface information; and sending the packet to a user plane function network element based on the session identifier corresponding to the virtual interface information via a user plane tunnel corresponding to the session identifier, wherein the user plane tunnel is a transmission channel between the access gateway function network element and the user plane function network element.

* * * * *